(12) United States Patent
Wang

(10) Patent No.: US 9,864,264 B2
(45) Date of Patent: Jan. 9, 2018

(54) SYSTEMS AND METHODS FOR DISPLAYING AN IMAGE OR VIDEO ON A RETRO-REFLECTIVE SCREEN

(71) Applicant: MirraViz, Inc., Sunnyvale, CA (US)

(72) Inventor: Michael Wang, Sunnyvale, CA (US)

(73) Assignee: MIRRAVIZ, INC., Sunnyvale, CA (US)

( * ) Notice: Subject to any disclaimer, the term of this patent is extended or adjusted under 35 U.S.C. 154(b) by 0 days.

(21) Appl. No.: 15/074,796

(22) Filed: Mar. 18, 2016

(65) Prior Publication Data

US 2016/0205388 A1 Jul. 14, 2016

Related U.S. Application Data

(63) Continuation of application No. 14/973,494, filed on Dec. 17, 2015, which is a continuation of application
(Continued)

(51) Int. Cl.
*G03B 21/60* (2014.01)
*G03B 21/606* (2014.01)
(Continued)

(52) U.S. Cl.
CPC .......... *G03B 21/606* (2013.01); *A63F 13/213* (2014.09); *A63F 13/26* (2014.09); *B29D 11/00605* (2013.01); *G02B 5/124* (2013.01); *G02B 23/125* (2013.01); *G02B 27/01* (2013.01); *G02B 27/017* (2013.01);
(Continued)

(58) Field of Classification Search
CPC ............ B29D 11/00605; G02B 23/125; G02B 27/01; G02B 27/017; G02B 27/0172; G02B 27/2235; G02B 5/124; G02B 5/122; G03B 21/60; G03B 21/602; G03B 21/606; G09B 9/307; H04N 13/0429; H04N 13/044; H04N 13/0459; H04N 13/0468; H04N 13/047;
(Continued)

(56) References Cited

U.S. PATENT DOCUMENTS 3,200,702 A 8/1965 Giordano
5,572,229 A 11/1996 Fisher
(Continued)

FOREIGN PATENT DOCUMENTS

JP 2011-197674 A 10/2011
WO WO 2012/054231 A2 4/2012

OTHER PUBLICATIONS

U.S. Appl. No. 15/074,777, filed Mar. 18, 2016, Wang
(Continued)

*Primary Examiner* — Sultan Chowdhury
*Assistant Examiner* — Magda Cruz
(74) *Attorney, Agent, or Firm* — Wilson Sonsini Goodrich & Rosati

(57) ABSTRACT

A display system comprises a projector combined with a retro reflective screen and a viewer distance from the projector such that the observation angle is less than approximately 2-3 degrees. The brightness of the image on the screen for the proposed display system is increased by a factor of ~100-500× as compared to traditional display systems with for an equivalent power/intensity light source.

16 Claims, 21 Drawing Sheets

Related U.S. Application Data

No. 13/917,587, filed on Jun. 13, 2013, now Pat. No. 9,244,339.

(60) Provisional application No. 61/660,651, filed on Jun. 15, 2012.

(51) Int. Cl.

| | | |
|---|---|---|
| *G02B 27/22* | (2006.01) | |
| *G03B 21/602* | (2014.01) | |
| *H04N 5/74* | (2006.01) | |
| *H04N 13/04* | (2006.01) | |
| *G02B 27/01* | (2006.01) | |
| *G02B 23/12* | (2006.01) | |
| *B29D 11/00* | (2006.01) | |
| *G09B 9/30* | (2006.01) | |
| *A63F 13/213* | (2014.01) | |
| *A63F 13/26* | (2014.01) | |
| *G06F 3/16* | (2006.01) | |
| *G06T 19/00* | (2011.01) | |
| *G02B 27/10* | (2006.01) | |
| *G03B 21/20* | (2006.01) | |
| *H04N 13/00* | (2006.01) | |
| *G02B 5/124* | (2006.01) | |
| *G02B 5/122* | (2006.01) | |

(52) U.S. Cl.
CPC ..... *G02B 27/0172* (2013.01); *G02B 27/1066* (2013.01); *G02B 27/2235* (2013.01); *G03B 21/2053* (2013.01); *G03B 21/60* (2013.01); *G03B 21/602* (2013.01); *G06F 3/16* (2013.01); *G06T 19/006* (2013.01); *G09B 9/307* (2013.01); *H04N 5/7491* (2013.01); *H04N 13/0029* (2013.01); *H04N 13/044* (2013.01); *H04N 13/047* (2013.01); *H04N 13/0429* (2013.01); *H04N 13/0447* (2013.01); *H04N 13/0459* (2013.01); *H04N 13/0468* (2013.01); *H04N 13/0497* (2013.01); *G02B 5/122* (2013.01); *H04N 13/0479* (2013.01); *H04N 2013/0463* (2013.01); *H04N 2013/0465* (2013.01)

(58) Field of Classification Search
CPC ............. H04N 5/7491; H04N 13/0479; H04N 2013/0463; H04N 2013/0465
See application file for complete search history.

(56) References Cited

U.S. PATENT DOCUMENTS

| | | |
|---|---|---|
| 5,606,458 A | 2/1997 | Fergason |
| 5,621,572 A | 4/1997 | Fergason |
| 5,763,049 A | 6/1998 | Frey et al. |
| 7,261,424 B2 | 8/2007 | Smith |
| 7,561,330 B2 | 7/2009 | Goto |
| 9,244,339 B2 | 1/2016 | Wang |
| 2002/0067466 A1 | 6/2002 | Covannon et al. |
| 2003/0156260 A1 | 8/2003 | Putilin et al. |
| 2004/0066554 A1* | 4/2004 | Wulff .................. B29C 55/04 359/462 |
| 2006/0109548 A1* | 5/2006 | Goto .................... G03B 21/10 359/449 |
| 2009/0096994 A1 | 4/2009 | Smits |
| 2012/0157204 A1 | 6/2012 | Kelsey et al. |
| 2013/0083291 A1* | 4/2013 | Smithwick ........... G03B 21/60 353/7 |
| 2013/0342813 A1 | 12/2013 | Wang |
| 2016/0178815 A1 | 6/2016 | Wang |
| 2016/0199729 A1 | 7/2016 | Wang |
| 2016/0205392 A1 | 7/2016 | Wang |

OTHER PUBLICATIONS

U.S. Appl. No. 15/074,805, filed Mar. 18, 2016, Wang.
U.S. Appl. No. 15/074,809, filed Mar. 18, 2016, Wang.
Arrington, et al. Conjugate-optical retroreflector display system: optical principles and perceptual issues. Journal of the SID. 2000; 8(2):123-128.
Hua, et al. Study of the Imaging Properties of Retro-reflective Materials Used in Head-Mounted Projective Displays (HMPD5). Proc. SPIE vol. 4711, pp. 194-201.
International preliminary report on patentability dated Dec. 16, 2014 for PCT/US2013/045716.
International search report and written opinion dated Feb. 18, 2014 for PCT/US2013/045716.
Notice of allowance dated Sep. 28, 2015 for U.S. Appl. No. 13/917,587.
Office action dated May 21, 2015 for U.S. Appl. No. 13/917,587.
Rolland, et al. Development of head-mounted projection displays for distrbuted, collaborative, augmented reality applications. Presence. 2005; 14(5):528-549.
Office Action dated Mar. 8, 2017 for U.S. Appl. No. 14/973,494.
Office Action dated Mar. 17, 2017 for U.S. Appl. No. 15/074,777.
Office Action dated Mar. 31, 2017 for U.S. Appl. No. 15/074,805.

* cited by examiner

SYSTEMS AND METHODS FOR DISPLAYING AN IMAGE OR VIDEO ON A RETRO-REFLECTIVE SCREEN

CROSS-REFERENCE

This application is a continuation application of U.S. patent application Ser. No. 14/973,494, filed Dec. 17, 2015, which is a continuation application of U.S. patent application Ser. No. 13/917,587, filed Jun. 13, 2013, which claims priority to U.S. Provisional Patent Application Ser. No. 61/660,651, filed Jun. 15, 2012, each of which is entirely incorporated herein by reference.

BACKGROUND

Current state-of-the-art display systems generally consist of either flat-panel displays or projector-based displays. The flat-panel displays are generally based on liquid crystal display (LCD) pixels with light emitting diode (LED) backlighting or plasma-based screens. In some cases it is difficult to attain screen sizes significantly larger than 80 inches in the diagonal dimension due to several considerations. For flat-panel displays, nonlinear increases in cost as the screen size grows, as well as high power consumption, may limit screen sizes to below 80 inches at typical consumer price points. For projection-based displays, decreasing screen brightness and increasing power consumption, projector size and projector noise may be significant limitations if the screen size is increased above 80 inches. Additionally, for both type of displays there is currently no optimal solution for glasses free 3-D immersive viewing. Current 3-D display systems rely on either active or passive glasses, or require the viewer to be located in a substantially constrained region of space in line-of-sight of the display.

SUMMARY

Recognized herein is the need for display systems that are improved in relation to systems currently available. In particular, recognized herein is the need for a system that permits multiple viewers to view individual customized video streams simultaneously on the same screen as well as a glasses free 3-D immersive viewing capability. This type of capability may enable an immersive multiplayer gaming experience that does not currently exist with display systems currently available.

The present disclosure provides display devices, systems and methods. Some embodiments provide displays utilizing a projector and a reflective screen.

The present disclosure provides methods and systems for enabling a display system with several properties, including, without limitation: a) Significant power reduction compared to conventional display systems by a factor on the order of approximately 100-500, b) Significant cost and weight reduction by a factor on the order of greater than or equal to about 10 compared to conventional display systems, b) The ability to simultaneously display multiple video or image streams on the same area of a shared screen without crosstalk, c) Significantly improved speed, precision and accuracy of real-time image alignment, orientation and magnification, d) Ultrahigh screen resolution capable of achieving an increased effective pixel count (>10×) in relation to 1080p displays, e) Glasses free immersive three-dimensional (3-D) viewing capability without constraints on the viewer's position, and f) The ability to effectively display an image on a flexible screen.

In an aspect of the present disclosure, a display system comprises a projector combined with a retro reflective screen and a viewer distance from the projector such that the observation angle is small, in some cases less than approximately 2 degrees. The observation angle is defined as the angle between the line from the projector to any given location on the screen and the line from that same location on the screen to the eye(s) of the viewer. Another aspect of the invention provides methods to manufacture and integrate the projector and screen capabilities. Automated algorithms for enabling fast and precise image alignment, orientation and magnification are also described herein. The algorithms in some cases are implemented with the aid of a computer system.

In another aspect of the present disclosure, a display system comprises a retro-reflective screen configured to reflect incident light along a direction that is substantially anti-parallel to the direction of propagation of the incident light, and a projector for projecting light characterizing an image or video onto the retro-reflective screen without the passage of light through a beam splitter.

In another aspect of the present disclosure, a method for projecting an image or video comprises (a) directing projected light from a projector to a retro-reflective screen in optical communication with the projector, wherein the projected light characterizes an image or video, and wherein the retro-reflective screen is configured to reflect incident light along a direction that is substantially anti-parallel to the direction of propagation of the incident light; and (b) presenting light reflected from the retro-reflective screen to a viewer that is adjacent to the projector, wherein the viewer is at an observation angle less than about 3° at a distance of at least about 2 feet from the retro-reflective screen.

In another aspect of the present disclosure, a method for determining an edge of a retro-reflective screen comprises (a) directing projected light from a projector to a retro-reflective screen in optical communication with the projector while moving one or both of the projector and the retro-reflective screen in relation to one another such that the projected light scans at least a portion of the retro-reflective screen; and (b) measuring, with the aid of a photo detector adjacent to the projector, reflected light from the retro-reflective screen upon directing the projected light of (a) to the retro-reflective screen. A decrease in intensity of the reflected light by a factor of at least about 2 is indicative of an edge portion of the retro-reflective screen. In some cases, the method comprises (c) determining, with the aid of a computer processor, an edge portion of the retro-reflective screen based upon a decrease in intensity of the reflected light by a factor of at least about 2.

In another aspect of the present disclosure, a method for displaying an image or video comprises (a) directing projected light from a projector to a retro-reflective screen in optical communication with the projector while moving one or both of the projector and the retro-reflective screen in relation to one another such that the projected light scans at least a portion of the retro-reflective screen; (b) measuring, with the aid of a photo detector adjacent to the projector, reflected light from the retro-reflective screen upon directing the projected light of (a) to the retro-reflective screen; and (c) adjusting the intensity of the projected light in response to the intensity of the reflected light measured in (b).

In another aspect of the present disclosure, a display system comprises a retro-reflective screen in optical communication with a projector, wherein the display system does not have a beam splitter.

In another aspect of the present disclosure, a method for projecting an image or video comprises directing projected light from a projector to a retro-reflective screen in optical communication with the projector, wherein upon the directing, the projected light is reflected at an observation angle less than about 3° at a distance of at least about 2 feet from the retro-reflective screen.

In another aspect of the present disclosure, a method for determining a viewing direction and/or orientation of a user (e.g., viewer) in relation to a viewing screen comprises (a) directing infrared light from an infrared light source to the viewing screen having a retro-reflective portion and one or more infrared light-blocking portions; (b) measuring, with the aid of a photo detector adjacent to the infrared light source, reflected infrared light from the viewing screen upon directing the infrared light to the retro-reflective screen in (a); and (c) correlating, with the aid of a computer processor, (i) a factor of at least about 2 decrease in intensity of the reflected infrared light with the transition of a viewing direction and/or orientation of the user from the retro-reflective portion to at least a subset of the one or more infrared blocking portions, and (ii) a factor of at least about 2 increase in intensity of the reflected infrared light with the transition of a viewing direction and/or orientation of the user from the one or more infrared light-blocking portions to the retro-reflective portion.

In another aspect of the present disclosure, a method for providing three-dimensional viewing comprises projecting light from a first projector and second projector onto a retro-reflective screen, the first projector adapted to rest adjacent to a left eye of a user (e.g., viewer) and the second projector adapted to rest adjacent to a right eye of the user, wherein light from each of the first projector and second projector is at least partially reflected from the retro-reflective screen. Reflected light, upon projection from the first projector, may have a higher intensity when viewed with the left eye of the user than the right eye of the user. Reflected light, upon projection from the second projector, may have a higher intensity when viewed with the right eye of the user than the left eye of the user.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, ended several details are capable of modifications in various obvious respects, all without departing from the disclosure. Accordingly the drawings and description are to be regarded as illustrator for nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity. A better understanding of the features and advantages of the present invention will be obtained by reference to the following detailed description that sets forth illustrative embodiments, in which the principles of the invention are utilized, and the accompanying drawings of which.

DETAILED DESCRIPTION

Figure 1:
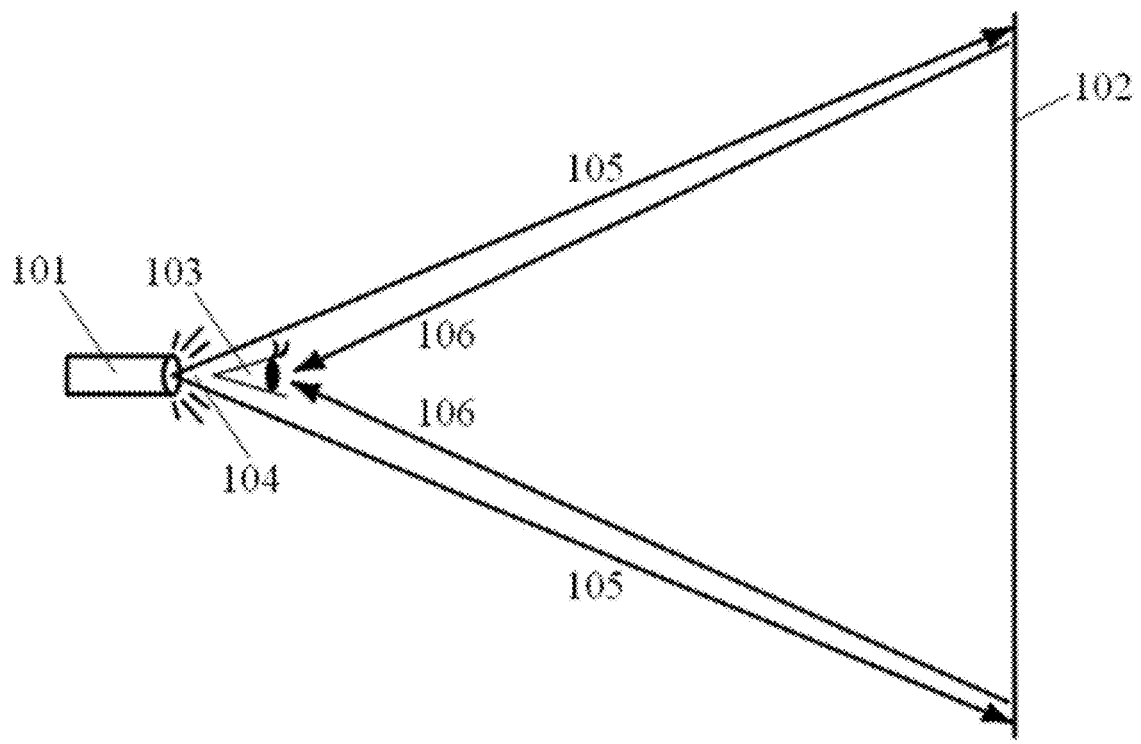
FIG. 1 shows a side view of a projector and retro-reflective screen, in accordance with an embodiment of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention.

The term "retroreflective" (also "retro-reflective" or "retro reflective" herein), as used herein, generally refers to a device or surface that reflects light back to or towards its source with a minimum scattering of light. In a retroreflective screen, an electromagnetic wave is reflected back along a vector that is parallel to but opposite in direction from the source of the wave. A retroreflective screen comprises a retroreflective surface.

The term "projector," as used herein, generally refers to a system or device that is configured to project (or direct) light. The projected light can project an image and/or video.

The term "observation angle," as used herein, generally refers to an angle between a first line directed from a projector to a given location on a screen and a second line from that same location on the screen to one or more eyes of a user (e.g., viewer).

The present disclosure provides a display system comprising a projector combined with a retro reflective screen at a viewer distance from the projector such that the observation angle (defined by the line from the projector to a given location on the screen and the line from that same location on the screen to the eye or eyes of the viewer) is less than approximately 1-3 degrees. In an example, at an observation angle of about 1 degree, the intensity is about three times lower versus the intensity at about 0.5 degrees, and at an observation angle of about 2 degrees the intensity decreases by another factor of about three versus one degree. The brightness of the image on the screen of the display system can be increased by a factor of about 100 to 500 as compared to traditional display systems with an equivalent power or intensity of light source.

Projector-Based Display Systems

An aspect of the present disclosure provides a display system comprising a retro-reflective screen configured to reflect incident light along a direction that is substantially anti-parallel to the direction of propagation of the incident light, and a projector for projecting light characterizing an image or video onto the retro-reflective screen without the passage of light through a beam splitter. The retro-reflective screen may reflect incident light from the projector to a viewer without the passage of light through either a beam splitter or any diffuser layers. In some cases, the retro-reflective screen reflects incident light from the projector to a viewer at an observation angle that is less than or equal to about 20°, 15°, 10°, 9°, 8°, 7°, 6°, 5°, 4°, 3°, 2°, 1.5°, 1°, 0.5°, 0.4°, 0.3°, 0.2°, or 0.1°. In some cases, the observation angle is between about 0.1° and 10°, or 0.2° and 3°. In some embodiments, the display system can operate without the need of a beam splitter, thereby advantageously providing for reduced complexity and/or cost as well as avoiding a roughly 4× or greater reduction in intensity compared to a system using a beam splitter.

The observation angle can be a function of the distance of the user from the retro-reflective screen. In some embodiments, the observation angle is less than about 5°, 4°, 3°, 2°, 1.5°, 1°, 0.5°, 0.4°, 0.3°, 0.2°, or 0.1° when the user is at a distance of at least about 1 foot, 2 feet, 3 feet, 4 feet, 5 feet, 6 feet, 7 feet, 8 feet, 9 feet, or 10 feet from the retro-reflective screen. In an example, the observation angle can be less than about 3° when the user is at a distance of at least about 4 feet from the retro-reflective screen. In some cases, the intensity of reflected light from the retro-reflected screen is a maximum at observation angle of about 0°, and decreases with increasing observation angle.

Reference will now be made to the figures, wherein like numerals refer to like parts throughout. It will be appreciated that the figures and features therein are not necessarily drawn to scale. The direction of a ray of light is illustrated by an arrow directed from a light source or reflective surface.

FIG. 1 shows a schematic side view of a system having a projector 101 and a retro-reflective screen 102, in accordance with an embodiment of the invention. The retro-reflective properties of the screen 102 cause a majority of the light incident upon the screen 102 to be reflected back towards the projector 101 in a tight directional cone of light regardless of the incident angle. This is in contrast to some conventional screens which scatter incident light in a relatively isotropic manner. In such a conventional screen set up only a very small fraction of the light incident on the screen 102 actually impinges upon the viewer's eyes 103. Because of the retro-reflective effect with the proposed system, if the viewer's eye 103 is in close proximity to the projector such that the angle 104 defined by the path 105 from the projector to the reflective screen and returning 106 to the viewer's eye is small, then the brightness of the image may be increased by as much as 100-500 times over a conventional projector and reflective screen set up. The system of FIG. 1 in some cases does not have a beam splitter.

Figure 2:
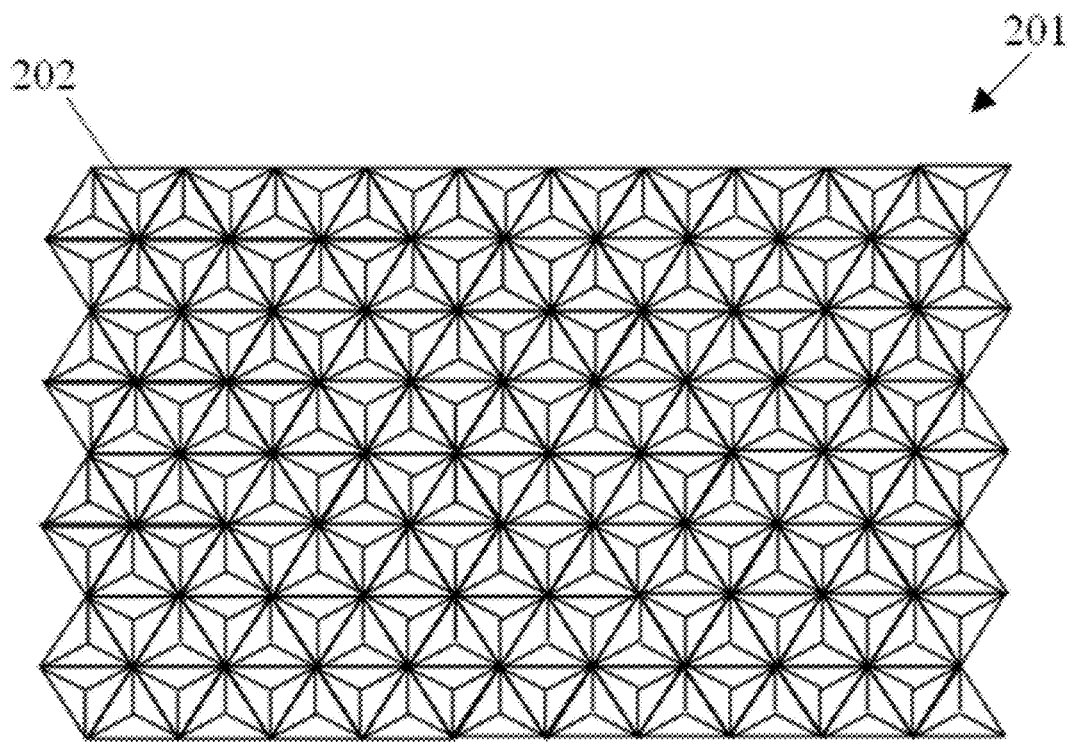
FIG. 2 shows a front view of a representative retro-reflective screen, in accordance with an embodiment of the invention.

FIG. 2 shows a front view of a retro-reflective screen 201, in accordance with an embodiment of the invention. The retro-reflective screen is comprised of an array of truncated corner cube reflectors 202. The corner cube reflectors 202 may also be comprised of alternative geometries. Examples of corner cube reflectors are provided in U.S. Pat. No. 5,763,049 to Frey et al. and U.S. Pat. No. 7,261,424 to Smith, which patents are entirely incorporated herein by reference. In some embodiments, the size of each of the corner cube reflectors 202 is smaller than the anticipated or predicted pixel size of the projected image, with the pixel size determined by the combination of the projector display system and the distance of the projector from the retro-reflective screen.

Figure 3:
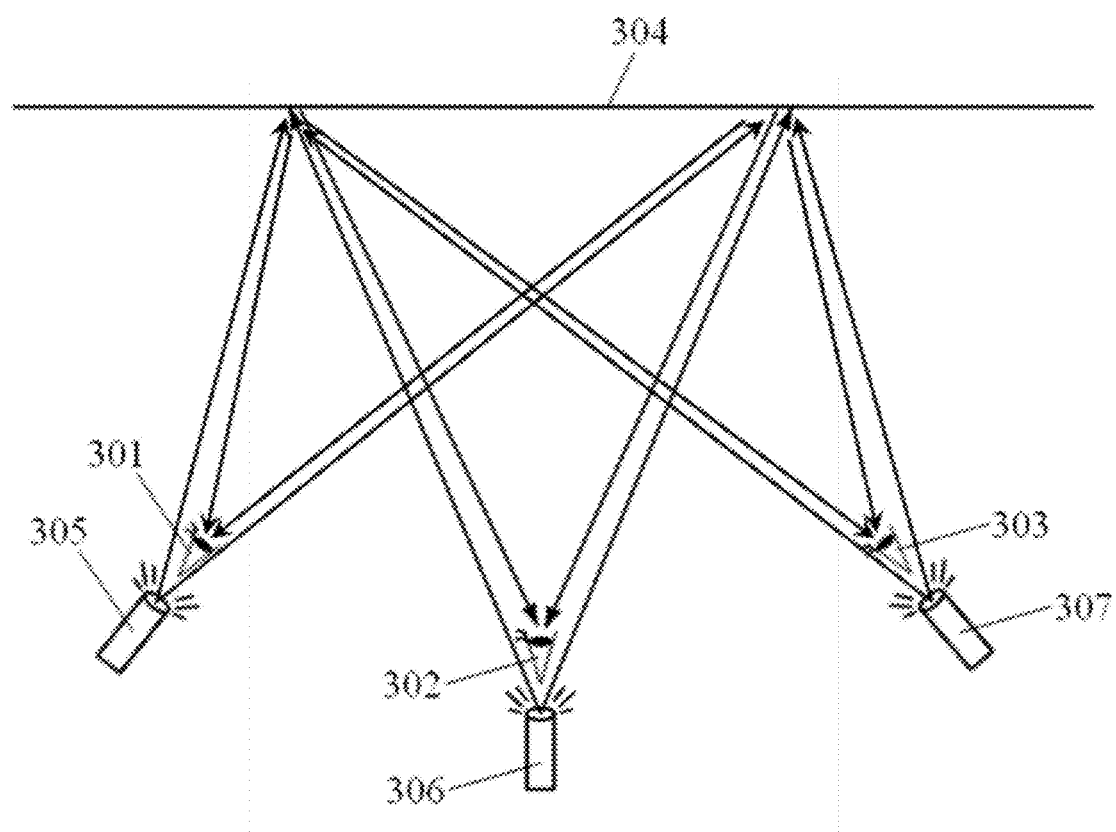
FIG. 3 shows a top view of a schematic showing the capability to have multiple users/eyes viewing independent image or video sources, in accordance with an embodiment of the invention.

FIG. 3 is a top view of a system describing the capability to have multiple users/eyes 301, 302 and 303 viewing independent image or video sources, in accordance with an embodiment of the invention. A retro-reflective screen 304 can be configured to have a highly directional nature, which may have the result that only eyes in close proximity to a given projector 305, 306 and 307 will be able to see the image or video being projected from that projector onto the retro-reflective screen 304. This may enable multiple users to each view an independent and different video or image within overlapping areas of a single screen.

Figure 4:
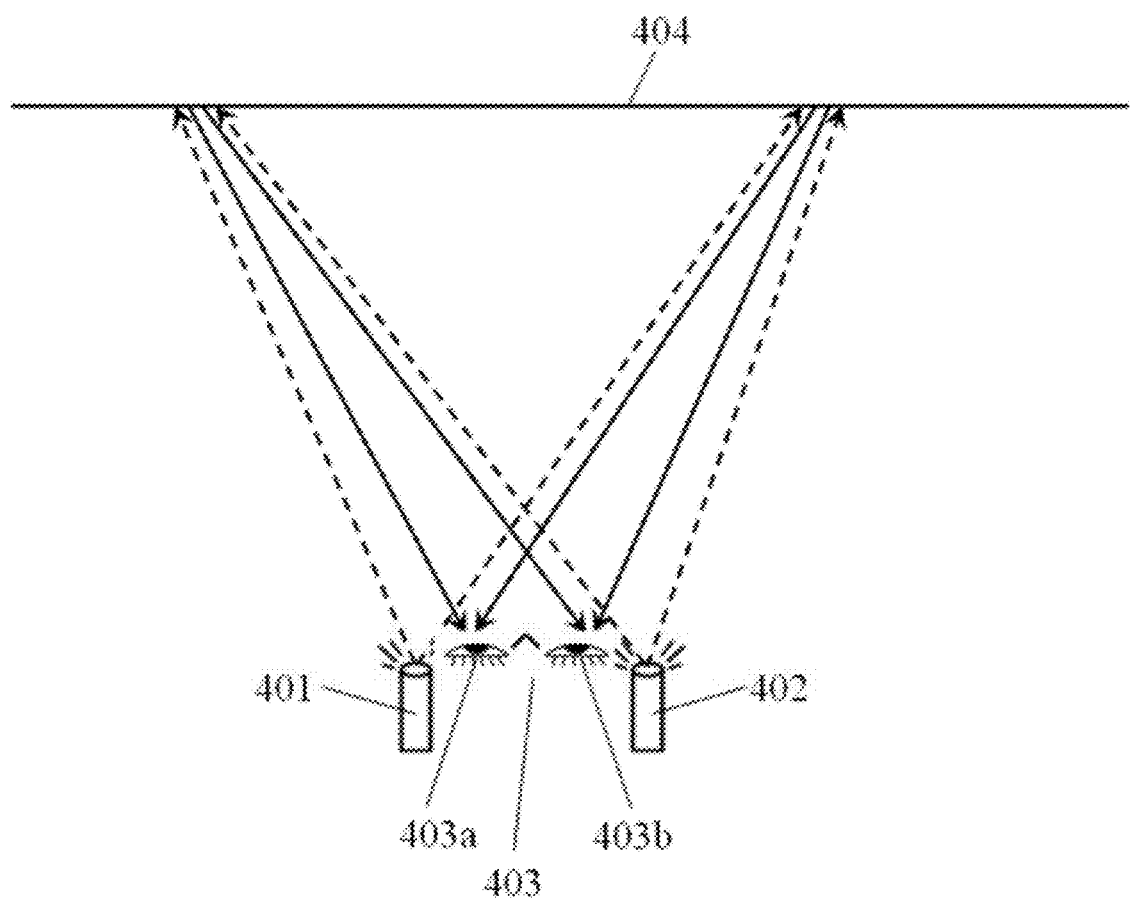
FIG. 4 a top view of schematic showing the ability to display 3-D videos and images, in accordance with an embodiment of the invention.

FIG. 4 is a top view of schematic showing a system that displays three-dimensional ("3-D" or "3D") videos or images, in accordance with an embodiment of the invention. The system includes dual projectors 401 and 402 mounted on or adjacent to the head of a user 403 (eyes shown). The projectors 401 and 402 can be mounted on a housing that is adapted to secure to the head of a user, or secured to a user's shoulders or other mounting structure that secures to the user's body, such as the user's back. In some cases, if the distance of the viewer from the retro-reflective screen 404 and the proximity of the viewer's eyes 403 to the projector meet certain criteria, independent video streams may be viewed by the left and right eyes of the viewer without the requirement of either active or passive glasses. In some embodiments, 3D viewing is implemented by having an observation angle from the left eye 403a to the left projector 401 being smaller than the observation angle from the right eye 403b to the left projector 401 by a ratio of about 2 or greater. Alternatively, 3D viewing is implemented by having an observation angle from the right eye 403b to the right projector 402 being smaller than the observation angle from the left eye 403a to the right projector 402 by a ratio of about 2 or greater. For example, if the observation angle for the left eye 403a to the left projector 401 is 1 degree, and the observation angle from the right eye 403b to the left projector 401 is 4 degrees, then there may be a significantly reduced intensity for the image projected by the left projector 401 as viewed by the right eye 403b. In effect, the right eye 403b may receive a small amount of intensity of light from the left projector 401, and the left eye 403a may receive a small amount of intensity of light from the right projector 402. In this manner, each eye 403a and 403b will effectively be viewing only the image or video from the projector adjacent to that eye 401 and 402, respectively. For a representative head mounted set up, a 3-D effect can be attained as long as the distance of the viewer from the retro-reflective screen 404 is in the range of approximately 1 to 30 feet, or 5 to 15 feet. This roughly coincides with typical viewing distances for a home theater setup or a home gaming system. The ability to achieve a 3-D video effect without the use of glasses or any other active or inactive film or optics (e.g., lenses) between the viewers eyes 403 and the screen and also without requiring the viewer 403 to be in a fixed position and orientation with respect to the screen 404 is unique to this display system and methodology.

In some examples, for 3D viewing, the left projector 401 is slightly to the outside of the left eye 403a and the right projector 402 is slightly to the outside of the right eye 403b. In some examples, if the median eye separation is 61 millimeters (mm), then the left projector 401 and the right projector 402 can be greater than 61 mm apart. In an example, the left projector 401 and the right projector 402 are from about 75 mm to 90 mm apart.

Systems for Determining Viewer and/or Screen Orientation

Another aspect of the present disclosure provides a method for determining an edge of a retro-reflective screen. Light that is projected from a projector (or "projected light") is directed to a retro-reflective screen in optical communication with the projector while moving one or both of the projector and the retro-reflective screen in relation to one another such that the projected light scans at least a portion of the retro-reflective screen. With the aid of a photo detector adjacent to the projector, light that is reflected from the retro-reflective screen (or "reflected light") is measured. A decrease in intensity of the reflected light by a factor of at least about 2 may be indicative of an edge portion of the retro-reflective screen.

Figure 5:
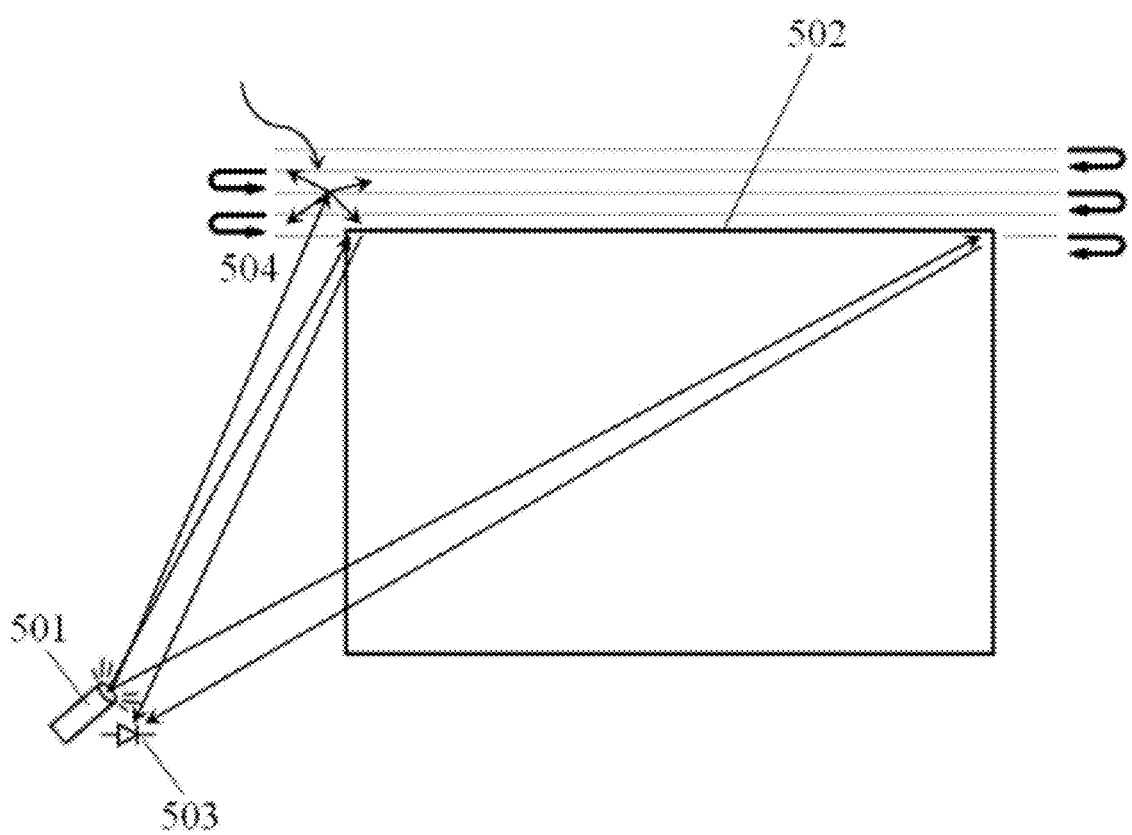
FIG. 5 is a perspective view of a schematic showing the ability to dynamically detect the edges and size of the retro reflective screen, in accordance with an embodiment of the invention.

FIG. 5 is a perspective view of a system that dynamically determines the edges and size of a retro reflective screen, in accordance with an embodiment of the invention. In this example, a scanning laser-based projector 501 is combined with a retro-reflective screen 502 such that low-cost, real-time auto adjustment and alignment of the image can be achieved using a single pixel photo detector 503 rather than a more expensive full resolution image capture camera. The figure schematically shows that a substantially lower intensity may return to the photo detector 503 when the laser scanning beam 504 is incident upon an area that is not part of the retro reflective screen, as the retro-reflective screen can enable an increase in intensity (in relation to areas that do not have retro-reflective properties) by a factor greater than or equal to about 2, 3, 4, 5, 6, 7, 8, 9, 10, 50, 100, or 200 for areas with retro-reflective properties. Areas that do not have retro-reflective properties can exhibit a decrease in intensity (in relation to areas with retro-reflective properties) by a factor greater than or equal to about 2, 3, 4, 5, 6, 7, 8, 9, 10, 50, 100, or 200. The photo detector 503 can be a visible light detector, or alternatively can be infrared detector in combination with an infrared light emitter within the projector.

Figure 6A:
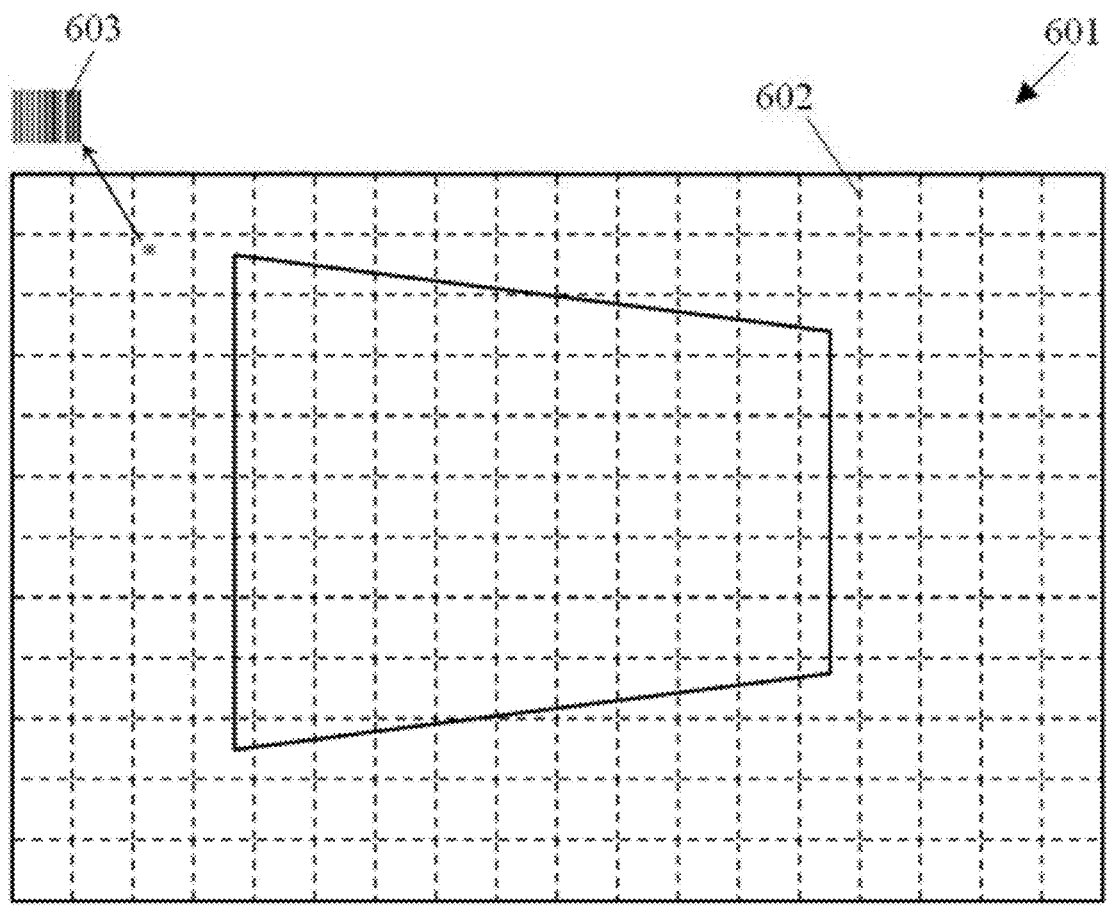
FIG. 6A is a front view of a schematic showing an alternative methodology to enable real-time determination of the viewer's position and orientation relative to the retro-reflective screen, in accordance with an embodiment of the invention.

FIG. 6A is a front view of a schematic showing an alternative methodology to enable real-time determination of the viewer's position and orientation relative to the retro-reflective screen 601, in accordance with an embodiment of the invention. In this figure the dashed lines 602 represent infrared blocking markings which may be transparent to visible light. The lines 602 are drawn dashed for illustrative clarity; in some cases, the lines 602 may be solid (or continuous) lines. Combining these markings with an infrared light emitter and detector, the viewer's position and orientation relative to the retro-reflective screen 601 can be readily determined without the need for a sophisticated video camera or extensive image processing. In this example, a non-scanner projector system uses a small percentage of a frame's duty cycle to project an infrared outline around the perimeter of the display area (outlined in solid black). With the use of a photo detector, each intersection of the display perimeter with one of the infrared light blocking markings can exhibit itself as a drop in intensity detected by the photo detector. The number and relative position of each of these drops in intensity along each of the sides of the display perimeter can be used to calculate (in some cases with the aid of a processor) the viewer's position, orientation and tilt (e.g., head tilt or body tilt) relative to the retro reflective screen 601. In contrast, conventional systems may require the use of expensive full resolution image capture camera and complex image process algorithms to attain this information. The determination of these parameters may provide a fully immersive 3D display experience wherein the image that the viewer sees changes as the viewer moves or rotates. The specific geometry of the markings are not required to be the rectangular grid, as shown. The marking may have various shapes or geometries, such as circular, triangular, square, rectangular, pentagonal, hexagonal, heptagonal, octagonal, nonagonal, or partial shapes or combinations thereof. In some embodiments, the combination of a projector with either scanning and/or pixel level control, combined with retro-reflective nature of the screen 601, enables precise and simple position and orientation determination. Additionally, barcode or other type of information (e.g., numeric identifier, geometric identifier) 603 may be incorporated into different blocking markings to assist in ensuring that accurate position and orientation parameters are determined.

Figure 6B:
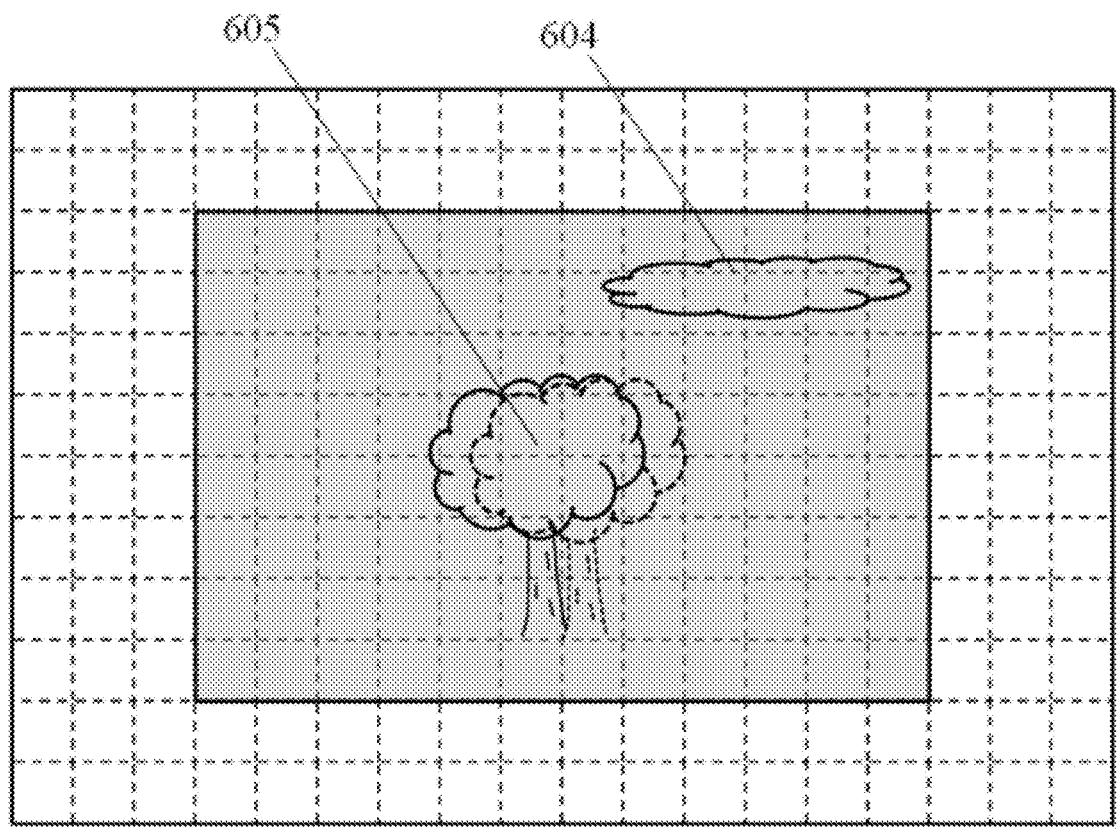
FIG. 6B is a front view of a schematic showing the use of the aforementioned techniques to enable real-time alignment of left and right projector sources in order to obtain an accurate 3-D visual effect, in accordance with an embodiment of the invention.

FIG. 6B is a front view of a schematic showing the use of the aforementioned techniques to enable real-time alignment of left and right projector sources in order to obtain a 3-D visual effect, in accordance with an embodiment of the invention. In this image, both the left and right image sources are aligned such that the left and right images of a cloud 604 which is far from the user are overlaid on top of each other, while a tree 605 which is closer to the user has an offset between the left and right image sources, as schematically indicated by two offset images of the tree 605 in the figure. The alignment of the images can be accomplished by digitally shifting the projected image or video rather than manual physical alignment of the left and right projector's. In addition to very precise image alignment, this can also allow for a lower cost system due to less restrictive physical alignment requirements for the left and right projectors.

Figure 7:
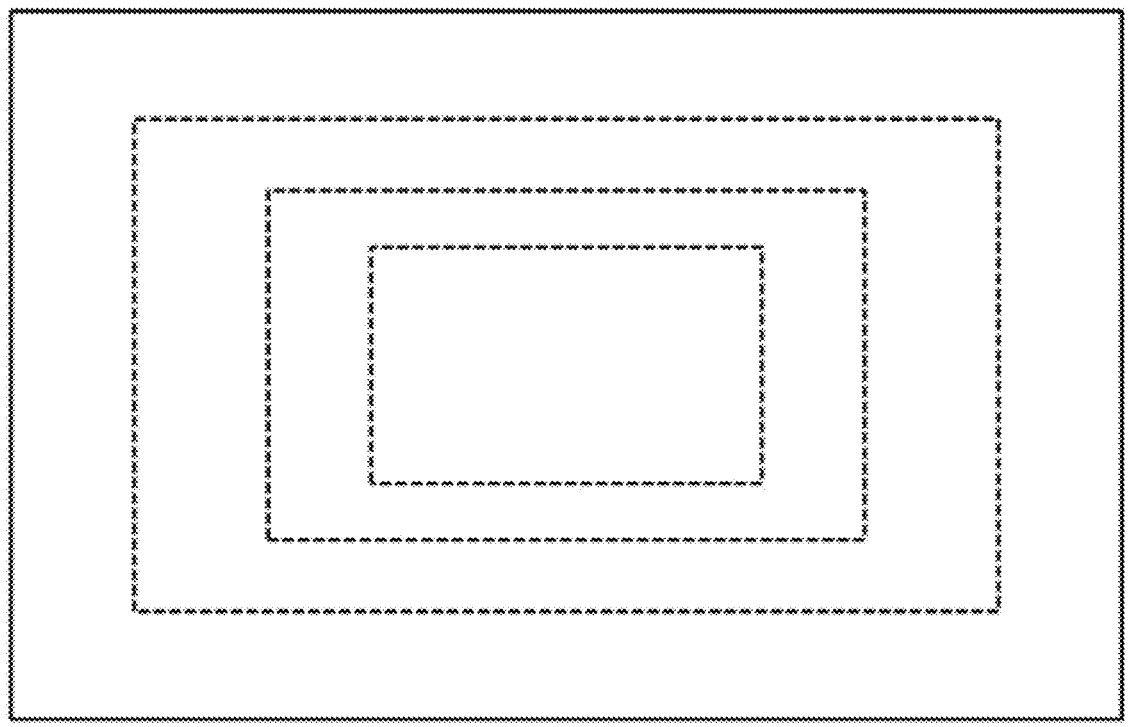
FIG. 7 is a front view of a schematic showing the ability to dynamically adjust the project image to match a desired preset size, in accordance with an embodiment of the invention.

FIG. 7 is a front view of a schematic showing the ability to dynamically adjust a projected image to match a desired preset size, in accordance with an embodiment of the invention. In this figure the dashed lines represent infrared blocking markings that are transparent to visible light. With these markings, combined with an infrared light emitter and detector, the projected image can be automatically adjusted to the desired preset size.

Mountable Projectors

Another aspect of the present disclosure provides mountable projectors, which may be used in conjunction with retro-reflective screens to enable viewers to view images or videos. Mountable projectors may be mountable on a head or generally a body of a user, or a structure that may be in proximity to the user.

Figure 8A:
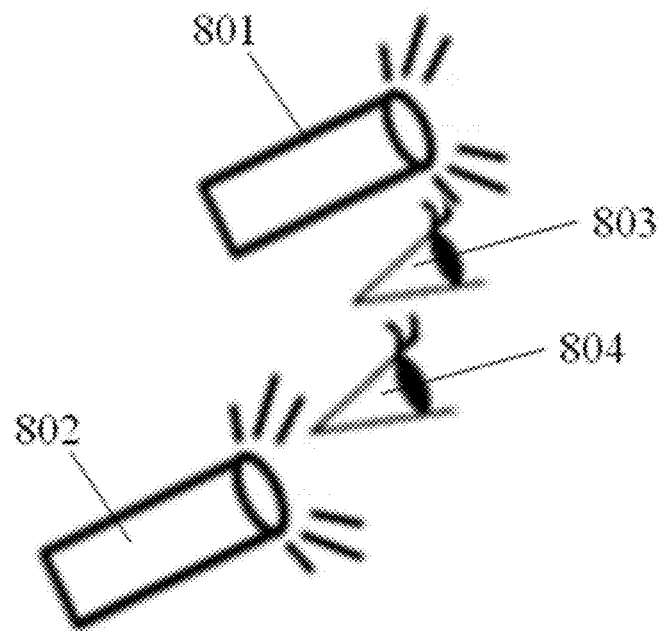
FIG. 8A shows a perspective and a top view of a head mountable projector wherein there are two projectors one on the left and one on the right, each in close proximity to the left and right eyes respectively, in accordance with an embodiment of the invention.
Figure 8A:
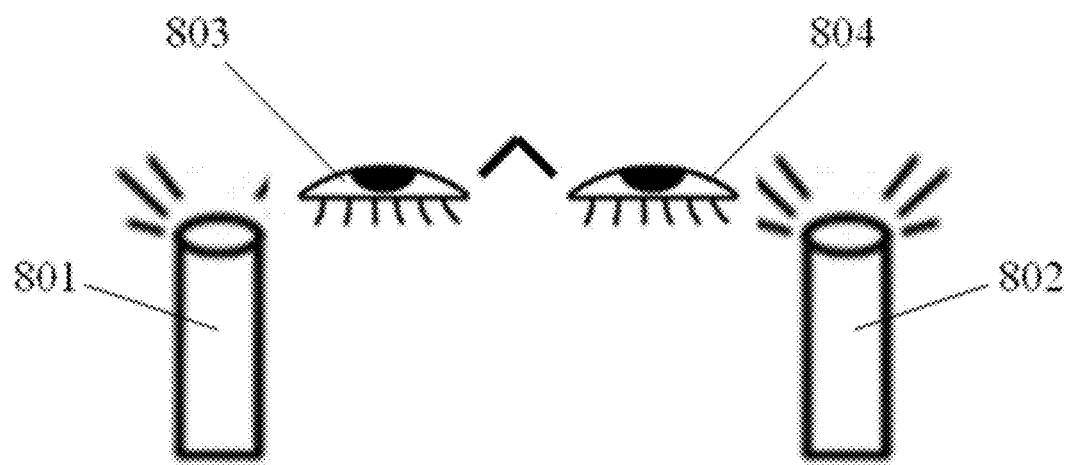
Figure 8B:
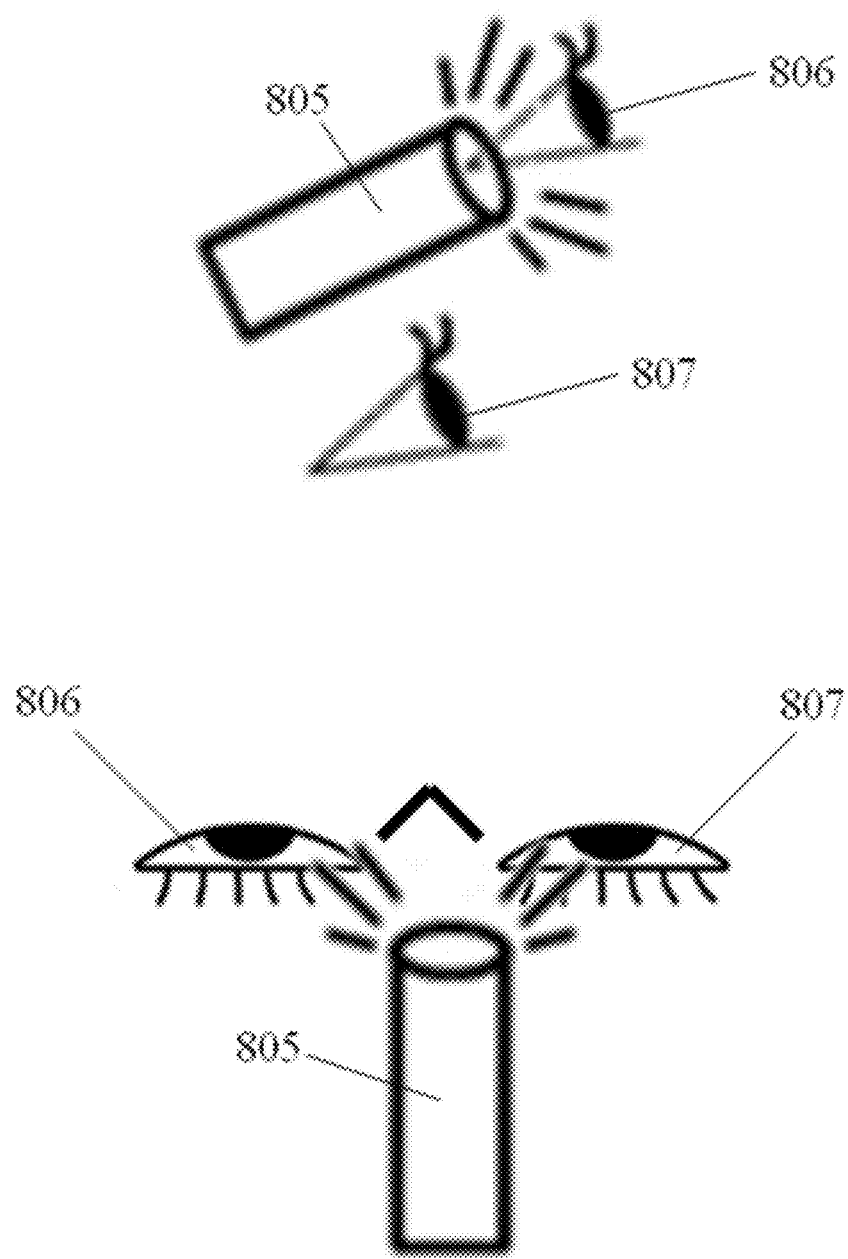
FIG. 8B shows a perspective and a top view of a head mountable projector wherein there is only one projector centered between the two eyes, in accordance with an embodiment of the invention.

FIG. 8A shows a perspective (top image) and a top view (bottom image) of a head mountable projector system wherein there are two projectors, one on the left 801 and one on the right 802 with respect to eyes of the user. The left projector 801 is next to a left eye 803 of the user, and the right projector 802 is next to a right eye 804 of the user. This configuration is schematically representative of a setup that may be used to provide glasses-free 3-D viewing. The projectors 801 and 802 can be mounted on or adjacent to the head of a user. The projectors can be mounted on a housing that is adapted to secure to the head of a user, or secured to a user's shoulders or other mounting structure that secures to the user's body, such as the user's back. The projectors can be oriented such that an observation angle between about 1° and 10°, or 2° and 3° is achieved. In some cases, the observation angle is less than or equal to about 20°, 15°, 10°, 9°, 8°, 7°, 6°, 5°, 4°, 3°, 2°, 1.5°, 1°, 0.5°, 0.4°, 0.3°, 0.2°, or 0.1°. The observation angle can be a function of the distance of the user from the retro-reflective screen, as described elsewhere herein. FIG. 8B shows a perspective and a top view of a head mountable projector 805 wherein there is only one projector centered between the two eyes 806 and 807 of the user. The systems of FIGS. 8A and 8B enable an increase in intensity by a factor of at least about 2, 3, 4, 5, 6, 7, 8, 9, 10, 20, 30, 40, 50, 60, 70, 80, 90, 100, or 200. This can advantageously provide for a weight and size reduction in order to have a small and lightweight head mounted projector system, while also retaining adequate projected display intensity. In some embodiments, the use of dual mounted left and right projectors, as in FIG. 8A, may provide a 3-D glasses-free viewing experience that, in some cases, is achieved via independent video streams being directed to each of the left and right eyes of the user (or viewer).

In some cases, projectors may be secured to a head of a user (or viewer). Alternatively, projectors may be secured to a body of a viewer with the aid of a support member that secures to the viewer's body. Such a setup may enable the height of the projector in relation to the viewer's body to be adjusted such that the projector can be aligned with the viewer's head. In some cases, however, projectors provided herein can be aligned with the viewer's head but secure to a mount or structure external to the viewer, such as the viewer's chair.

Figure 9:
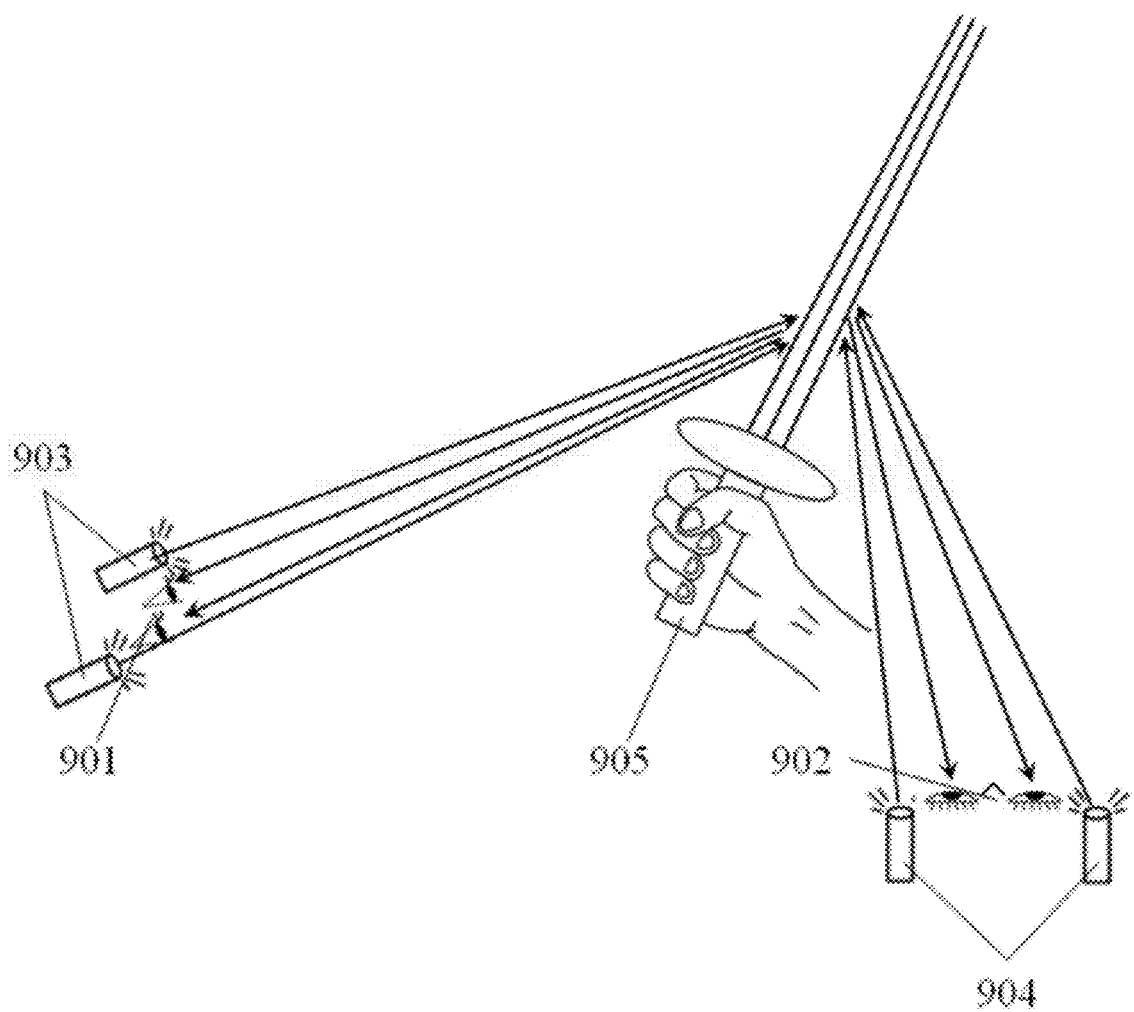
FIG. 9 schematically illustrates a method that enables virtual objects to be manipulated by one user and observed by multiple users, in accordance with an embodiment of the invention.

FIG. 9 is a perspective view of a system that can enable a virtual reality experience in which virtual objects can be manipulated by a first user (or entity) and viewed by one or more viewers (e.g., participants in a game or virtual reality experience), which may include any user manipulating the virtual object. The system provides the capability to display multiple independent image or video streams on the same area of a retro-reflective screen (not shown). The viewers 901 and 902 may each have head mountable projectors 903 and 904. In the illustrated example, a left viewer 901 and right viewer 902 are viewing a manipulated virtual object. The viewer on the left 901 may see a sword 905 on the retro-reflective screen towards the right portion of the left viewer's 901 display area, while the viewer on the right 902 may see the sword 905 on the retro-reflective screen towards the middle or left portion of the right viewer's 902 display area. The projectors 903 and 904 in this example may provide light towards the retro-reflective screen.

In an example, a projected image can be associated with a physical object. For example, in FIG. 9, the displayed sword can have a handle that is associated with a physical object (e.g., a game controller), but the remainder of the displayed sword is an image or video projected on the retro-reflective screen. This can provide for an augmented reality experience in which physical objects are associated with virtual objects.

Display Systems

Figure 10A:
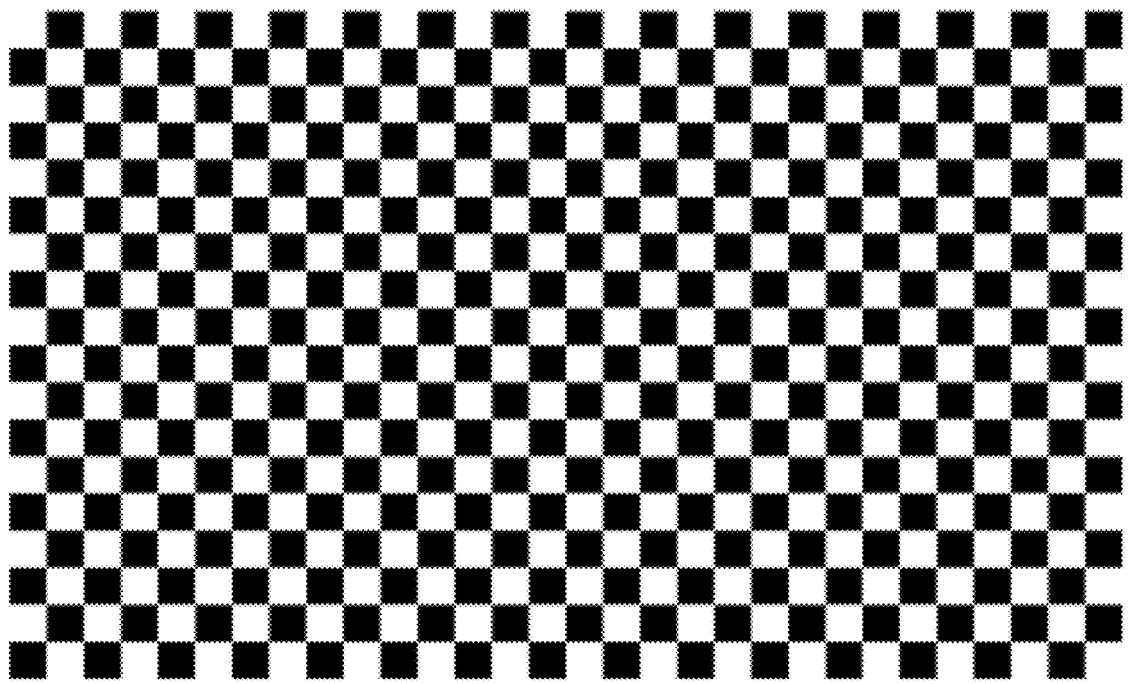
FIG. 10A shows a front view of a schematic showing a conventional display with a uniform resolution across the surface of the display, in accordance with an embodiment of the invention.
Figure 10B:
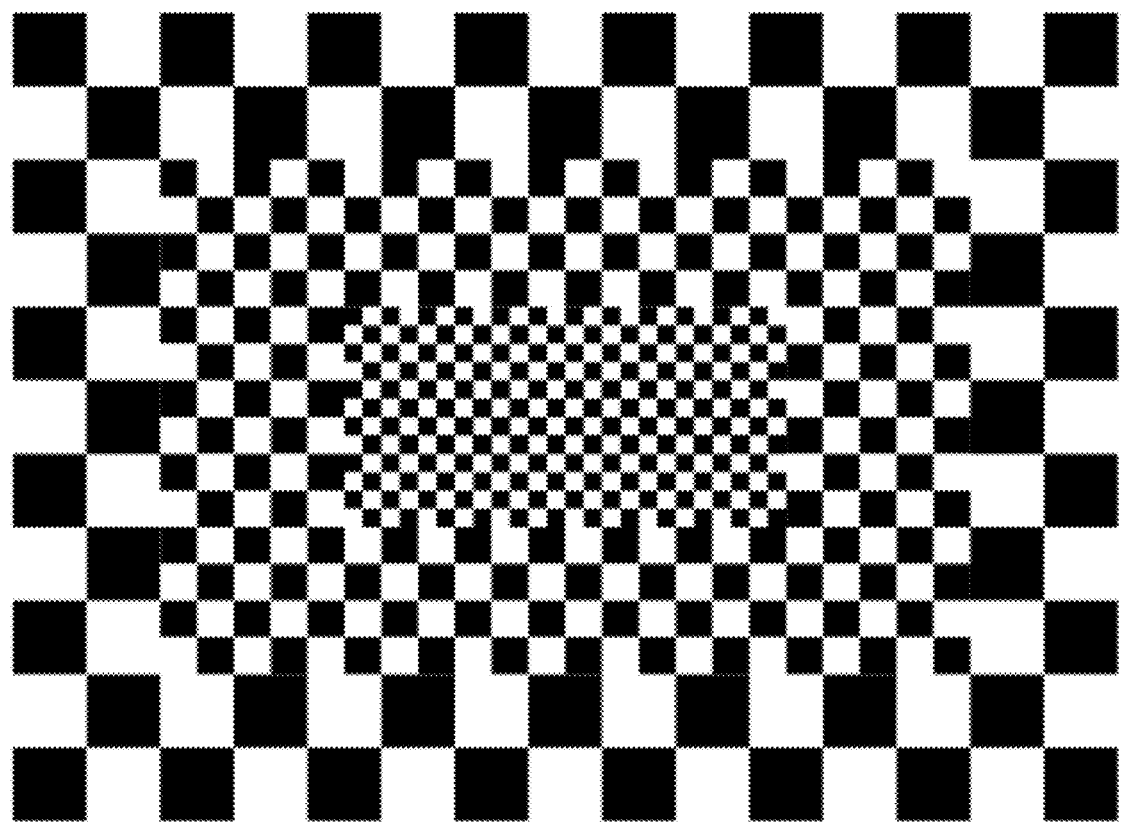
FIG. 10B schematically illustrates a display having a variable pixel density or resolution density across the surface of the display, in accordance with an embodiment of the invention.

FIG. 10A schematically illustrates a conventional display with a uniform resolution across the surface of the display. The display of FIG. 10A is implemented with the aid of a non-retro-reflective screen. FIG. 10B schematically illustrates a display (or screen) having a variable pixel density or resolution density across the surface of the display, in accordance with an embodiment of the invention. The variable pixel density of the display can be implemented in software by using the same pixel information from multiple pixels towards the edge of the display area. Variable pixel density displays can be most effectively implemented in the case of a scanning laser or light emitting diode (LED) projector or the pixel density of the projector is not fixed but is rather determined by the combination of the reflecting mirror scan speed and modulation rate of the laser or LED.

The screen of FIG. 10B has three areas with differing pixel densities (i.e., number of pixels per unit area). A central area has a first pixel density, a middle area has a second pixel density and an outer area has a third pixel density. The first pixel density is greater than the second pixel density, and the second pixel density is greater than the third pixel density.

The screen of FIG. 10B may be suited for head (or body) mountable projectors described elsewhere herein. Since the human eye has higher visual acuity towards the center of the gaze and lower resolution vision in the periphery due to higher concentration of cone cells towards the center of the retina, this approach can be used to increase effective screen resolution or screen size or combination of the two. In the illustrated example of FIG. 10B, the center of the image has a higher pixel density, while areas towards the edges of the screen have a lower pixel density and resolution. By having a non-uniform pixel density in this manner, a higher effective screen resolution can be achieved. In some embodiments, the display of FIG. 10B may be effectively implemented with the aid of a head mountable projector, as described elsewhere herein.

Figure 11:
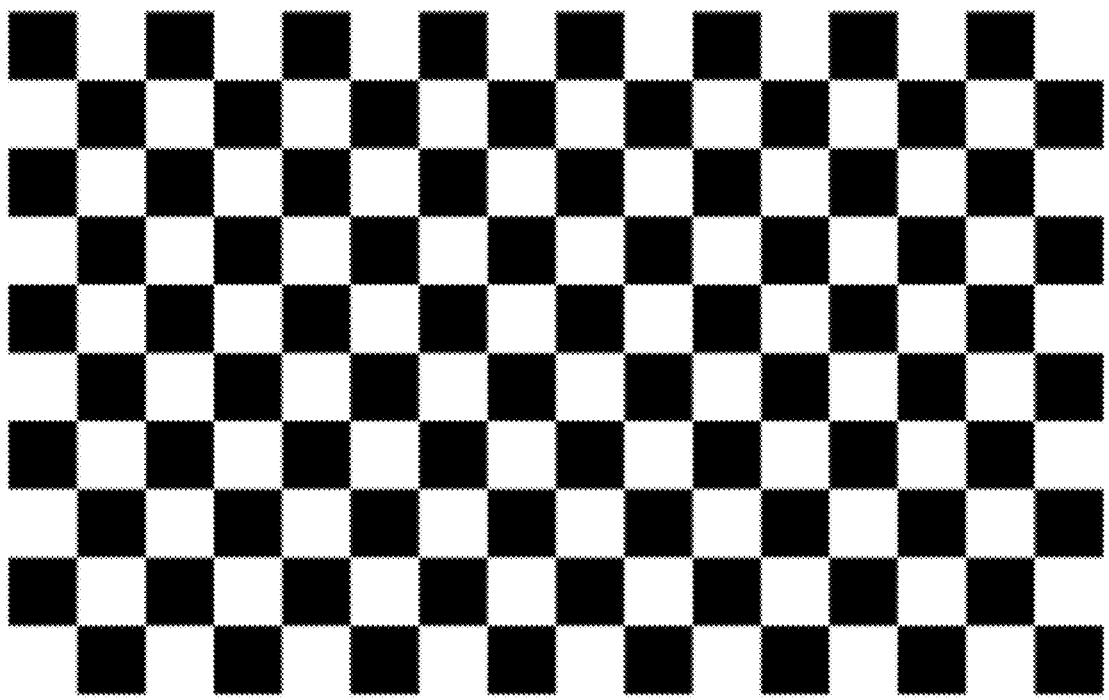
FIG. 11 shows a front view of schematic showing a conventional display with a default resolution across the surface of the display in comparison to a reduced size, higher pixel per inch resolution display of the invention.
Figure 11:
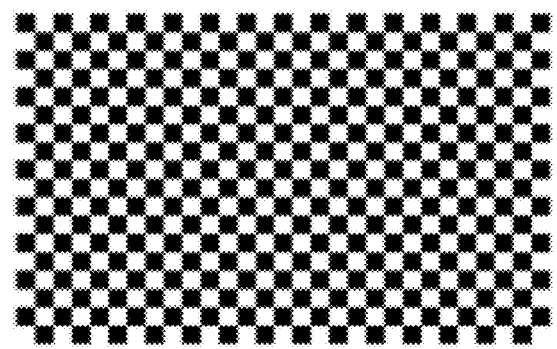

FIG. 11 is a front view of schematic showing a conventional display with the default resolution across the surface of the display. There may be cases where the distance between the viewer/projector and the screen is large, resulting in a default image size that is larger than desired. One of the advantages of a scanning projector system in conjunction with a retro-reflective screen utilizing corner cube elements smaller than the pixel size is that the image can be scaled down to a reduced size without appreciably sacrificing resolution or pixel count. The pixel density in such a case can be determined by the projector and is not limited by the size of the cube elements.

Figure 12:
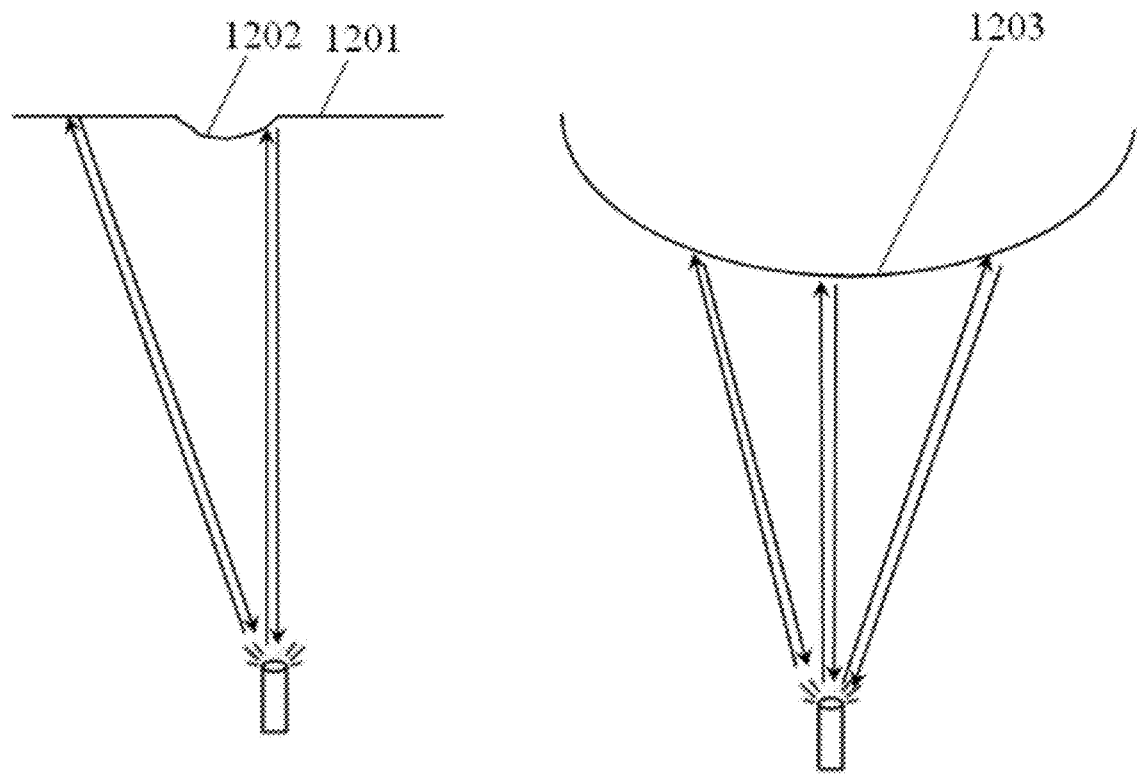
FIG. 12 shows the top view of a schematic showing that a display system of the invention is not significantly impacted by non-uniformities in the screen flatness.

FIG. 12 is a top view of a schematic showing an additional advantage of a display system of the disclosure using a retro-reflective screen 1201. In this setup, because of the retro-reflective nature of the corner cube elements, non-uniformities 1202 in the screen flatness do not impact the directionality of the reflected image from the screen 1201. This property enables low-cost manufacturing and installation for the retro-reflective screen 1201 by not requiring overly restrictive surface uniformity and/or surface protection schemes. In addition, innovative form factors and shapes can be used for the screen 1201. For example, on the right side of this figure an intentionally curved screen 1203 is shown. In some embodiments, retro-reflective screens with surface irregularities that can cause incident angle changes of up to about 1°, 2°, 3°, 4°, 5°, 10°, or 20° may provide display properties that are not appreciably diminished in relation to screens not having any surface irregularities.

Figure 13:
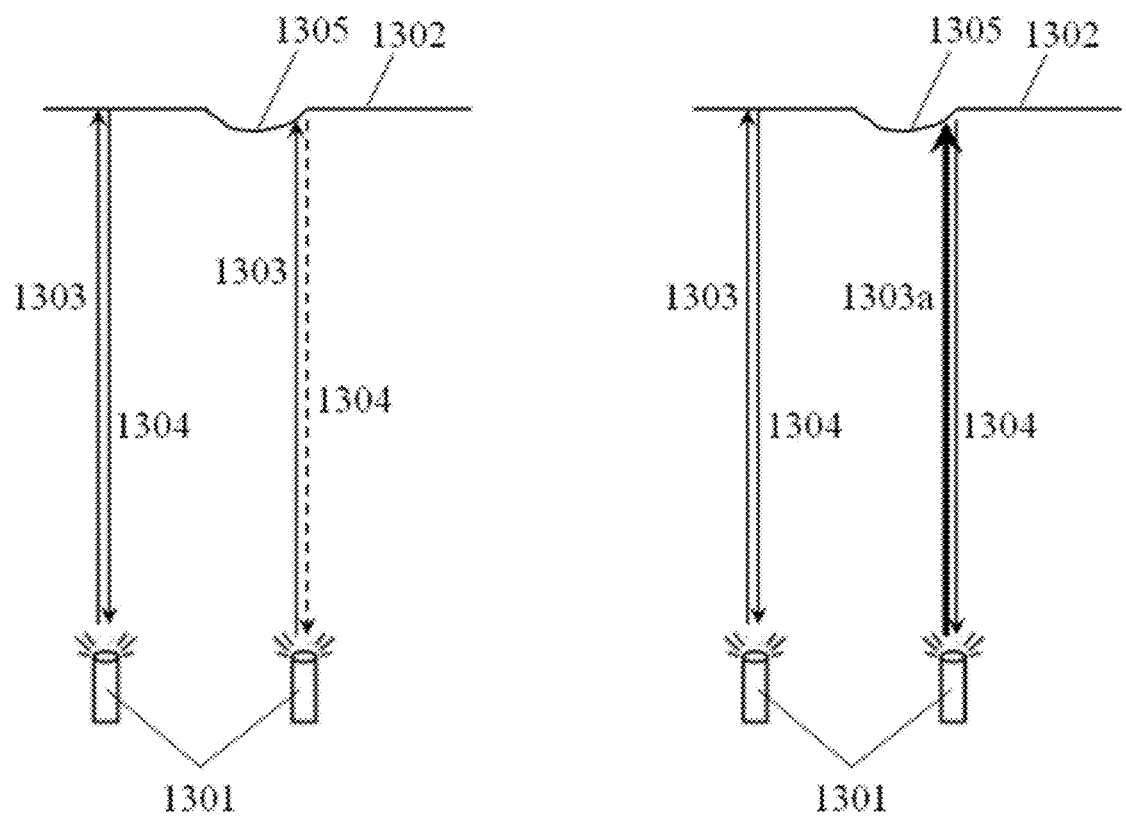
FIG. 13 shows the top view of a schematic showing an additional advantage of a display system of the invention to be able to readily detect local non-uniformities and locally modulate the projected intensity to compensate.

FIG. 13 schematically illustrates a display system utilizing the combination of a scanning laser or light emitting diode (LED) projector 1301 with a retro-reflective screen 1302, in accordance with an embodiment of the invention. Light from the laser or LED is directed to 1303 the retro-reflective screen 1302, which light is reflected 1304 by the retro-reflective screen 1302. The left side of this figure shows an example non-uniformity 1305 on the retro-reflective screen 1302, which may cause the intensity of the light returned to the viewer (i.e., reflected light) to be compromised or otherwise changed with respect to the intensify of light returned to the viewer from a uniform portion of the screen 1302. The non-uniformity 1305 can include one or more slightly defective corner cube elements, surface flatness irregularities, dirt, or other obstruction(s) that adversely impacts the retro-reflective properties of the screen. In some cases, the non-uniformity 1305 effects a decrease in intensity of reflected light. With the use of a photo detector, this local reduction in intensity can be detected. In subsequent frames of the video, the laser or LED intensity can be increased for the areas/pixels that require a higher intensity, thus aiding in compensating for the non-uniformity. In this manner the reflected image intensity can be made to be uniform. The right figure schematically shows a higher intensity beam of light 1303a directed to the compromised region 1305 (i.e., the region having the screen non-uniformity), resulting in a reflected intensity that better matches the original desired intensity. Similarly, for a highly curved screen surface at the edges of the screen, where the angle of the incident light can deviate significantly from the normal incidence angle, the reflected light intensity can be significantly reduced. In these cases, the laser or LED intensity can be similarly increased in those regions to compensate for the non-uniformity. This real-time intensity modulation at a local level cannot be easily accomplished with traditional display systems which do not incorporate both a scanning-based projector and a retro reflective screen.

Another aspect of the present disclosure provides a method for displaying an image or video, comprising directing projected light from a projector to a retro-reflective screen in optical communication with the projector while moving one or both of the projector and the retro-reflective screen in relation to one another such that the projected light scans at least a portion of the retro-reflective screen. Next, with the aid of a photo detector adjacent to the projector, reflected light from the retro-reflective screen is measured upon directing the projected light to the retro-reflective screen. The intensity of the projected light is adjusted in response to the measured intensity of reflected light. The intensity of the projected light can be adjusted to compensate, for example, for screen non-uniformities, or the angle at which the viewer is oriented in relation to the screen (e.g., normal incidence as opposed to non-normal incidence). In some cases, the intensity of the projected light is adjusted upon comparing, with the aid of a processor, the intensity of the reflected light against one or more set-point intensities.

The system of FIG. 13 can aid in dynamically adjusting projector light intensity to compensate for any retro-reflective screen non-uniformities. For example, a head or body mountable projector may include a photo detector that detects light reflected from the retro-reflective screen along an observation angle that includes the eyes of a viewer. The photo detector can be coupled to (e.g., in wired or wireless communication with) a computer processor (see below) that (i) measures reflected light intensity and (ii) dynamically adjusts the light intensity of the projector in response to any measured decrease in the intensity of reflected light. The computer processor can measure reflected light and dynamically adjust the intensity of projected light within a time period of at most about 5 seconds, 4 seconds, 3 seconds, 2 seconds, 1 second, 1 millisecond, or 1 microsecond, or, alternatively, within a time period nearly or substantially matched to the video refresh rate, such as, for example, 20-60 hertz (Hz).

Figure 14:
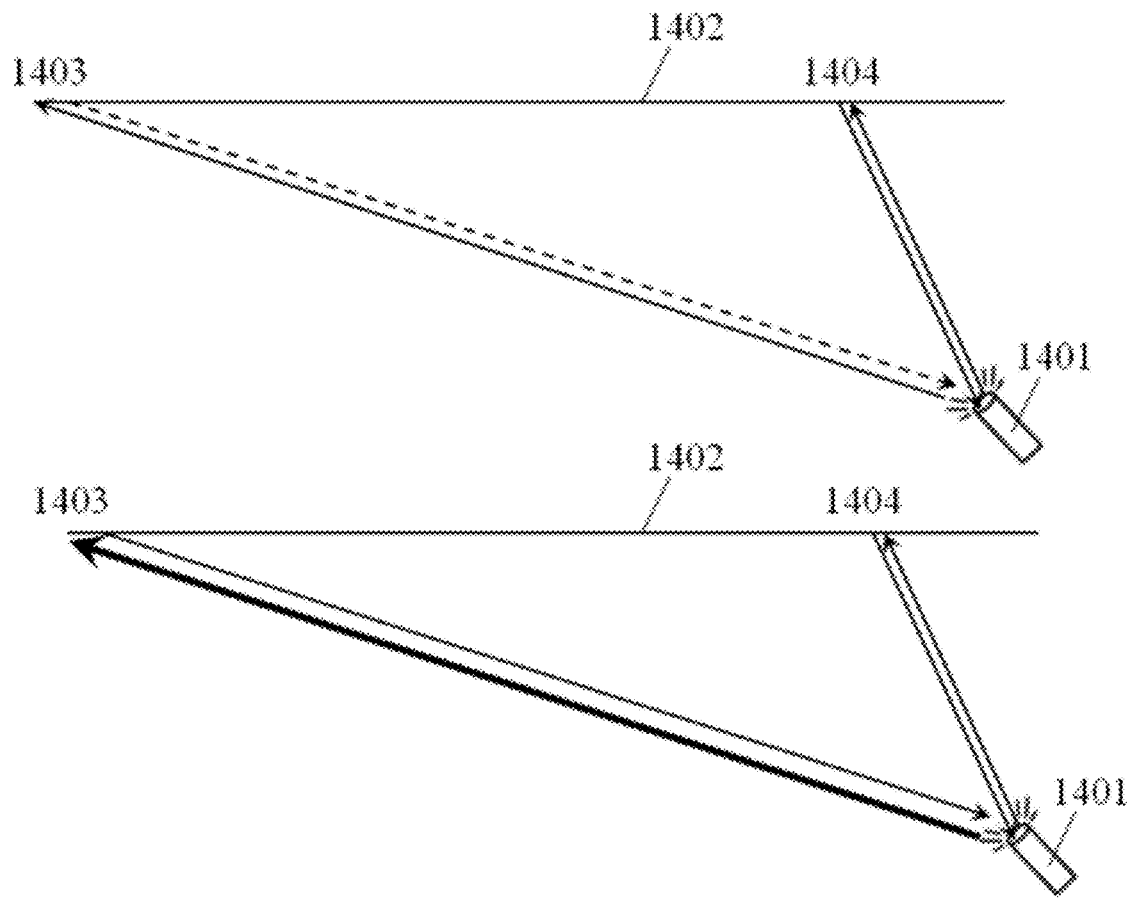
FIG. 14 shows the top view of a schematic showing the ability of the a display system of the invention to locally modulate intensity in order to compensate for a wide range of incident angles.

Systems of the present disclosure can compensate for a deceased intensity of reflected light in cases in which the decrease is at least in part due to viewing angle that deviates for direct normal incidence. FIG. 14 schematically illustrates a system for compensating for a decreased intensity of reflected light, in accordance with an embodiment of the invention. In this case, a projector (bottom right) 1401 is oriented at a screen 1402 at an angle that deviates from normal incidence, as measured with respect to a vector that is oriented perpendicularly with respect to a plane parallel to a surface of the screen 1402. The reflected intensity from the regions of the image farthest 1403 from the projector 1401 may have a lower intensity versus the regions closer 1404 to the projector 1401. This may be due to the incident angle being smaller for regions farther from the projector 1401, as shown in the figure. Again, in this case the intensity of the beam can be increased in those regions requiring a higher incoming intensity of light in order to match the desired reflected intensity.

Figure 15:
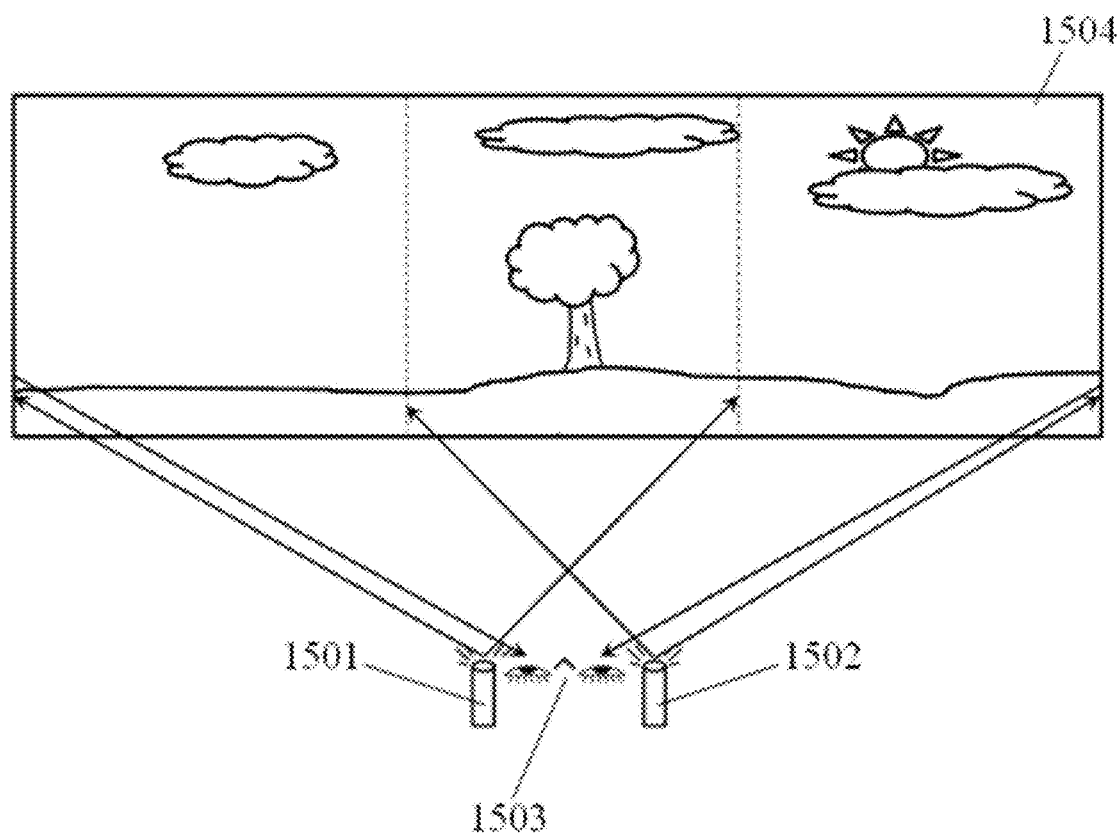
FIG. 15 shows a perspective view of a schematic showing how left and right projectors in a head mountable projector may be combined in order to form one much larger image or video, in accordance with an embodiment of the invention.

FIG. 15 schematically illustrates a system comprising a head (or body) mountable projector having left 1501 and right projectors 1502 that may be combined to provide a large or wide-area viewing experience, in accordance with an embodiment of the invention. The projectors 1501 and 1502 can be situated adjacent or in proximity to the eyes 1503 of a user. The system of FIG. 15 may be configured for use with images and videos provided by the projectors. Because of the ability to easily detect the location of specific pixels projected by each projector onto a retro-reflective screen 1504, alignment between the left and right images can be accomplished without requiring potentially expensive high pixel density detectors or the use of complex image processing.

Figure 16:
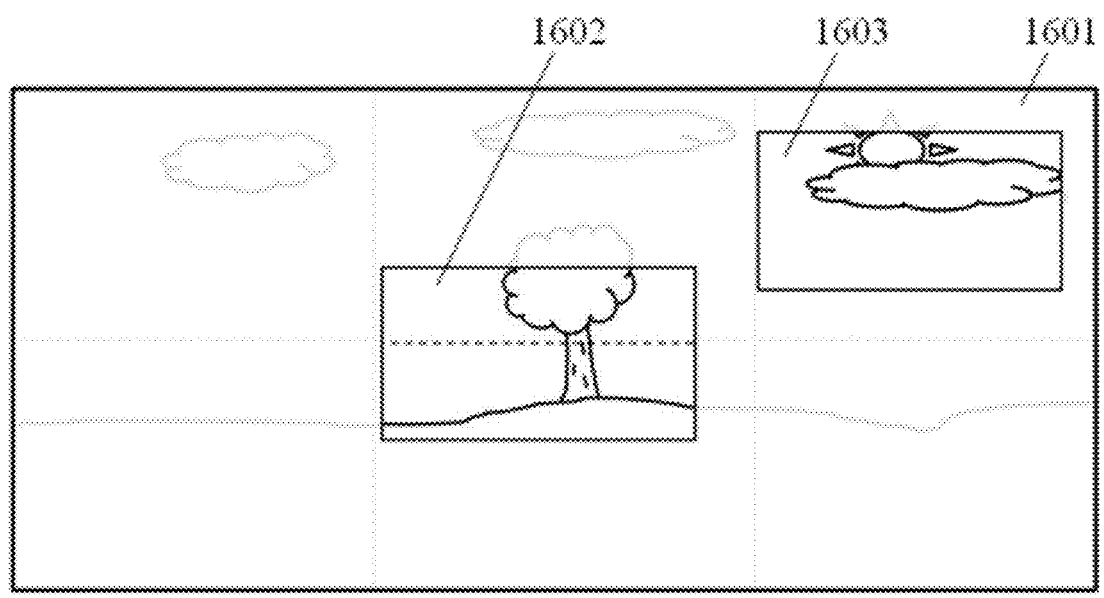
FIG. 16 shows the front view of the schematic showing the ability of a display of the invention to effectively have a system-level screen resolution significantly higher than that of a conventional display system.

FIG. 16 schematically illustrates a system having a system-level screen resolution significantly higher than conventional display systems, in accordance with an embodiment of the invention. The system comprises a retro-reflective screen 1601 and a projector (not shown) that is mounted on head or body of a user. If the video source or immersive media such as a video game has content that spans beyond a typical pixel resolution, such as, for example, a 1920×1080 pixel resolution, this larger immersive environment can be viewed using display systems of the invention. Using a head mountable projector, the user is able to view a 1920×1080 image that changes as the user turns and faces a different portion of the retro-reflective screen. In the illustrated example, a first region 1602 and a second region 1603 become apparent to the user as the user turns the head of the user to face the first region 1602 or second region 1603. In this figure, each of the two smaller regions 1602 and 1603 of the screen 1601 can represent a 1920×1080 projected image. The size of the overall image in this example may have a resolution greater than about 6000× 3000 pixels.

Figure 17:
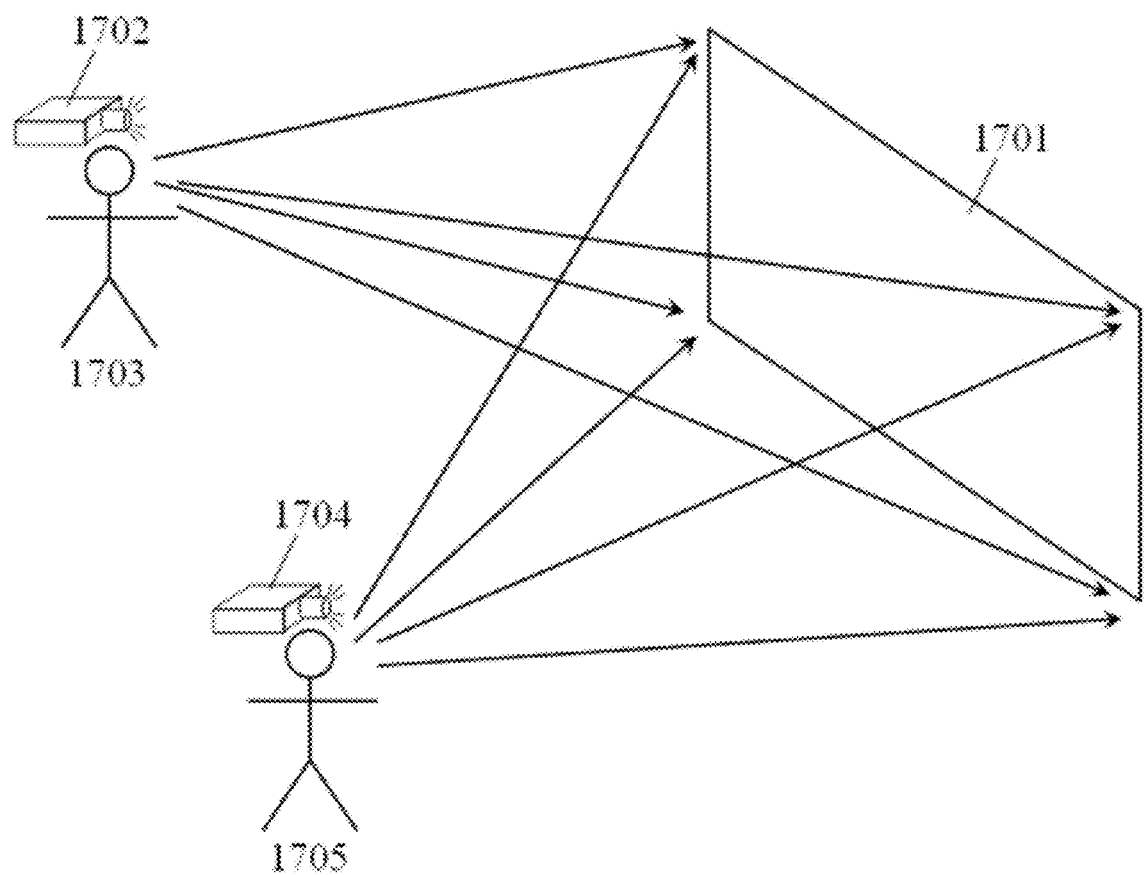
FIG. 17 schematically illustrates a large area display system, in accordance with an embodiment of the invention.

FIG. 17 schematically illustrates a display system that enables a wide or large area viewing experience, in accordance with an embodiment of the invention. The system of FIG. 17 comprises a retro-reflective screen 1701, a first projector 1702 adjacent to a first user 1703, and a second projector 1704 adjacent to a second user 1705. The system can be adapted for a long throw distance of at least about 10 feet, 20 feet, 30 feet, 40 feet, 50 feet, 100 feet, 200 feet, 300 feet, 400 feet, or 500 feet. For example, with a long throw distance of 100 feet and an observation angle of approximately 1°, the optimal viewing angle may be within the proximity of approximately 1-2 feet from the projector. This larger viewing proximity distance from the projector 1702 or 1704 can allow for the use of a stationary, non-battery operated projector. With an increase in intensity by a factor of at least about 2, 3, 4, 5, 6, 7, 8, 9, 10, 20, 30, 40, 50, 60, 70, 80, 90, 100, or 200, a projector with 2000 to 4000 Lumen brightness rating may have the capability to be able to project a bright image onto a 100 foot diagonal screen. Additionally, several projectors can be placed such that each projector shows a different image or video on the screen. For example, the first user 1703 can have a different (e.g., unique) viewing experience than the second user 1705. The first user 1703 can view an image or view that is different than the second user 1705. For example, the first user 1703 views a cloud while the second user 1705 views a tree. The first user 1703 and second user 1705 can be provided with sound to go along with each user's viewing experience, such as by way of headphones or other local speaker system. Such large area display can be effective for advertising purposes, or other showcase demonstrations, due, at least in part, to the qualities of the display size and having multiple images/videos on the same screen area.

Systems and methods of this disclosure provide various advantages, such as, without limitation: a) power reduction compared to conventional display systems, such as reduction by a factor of at least about 100 compared to conventional display systems; b) cost and weight reduction by a factor of at least about 10 compared to conventional display systems; c) the ability to simultaneously display multiple video and/or image streams on the same area of a screen; d) improved speed, precision and accuracy of real-time image alignment, orientation and magnification; e) ultrahigh screen resolution capable of achieving an effective pixel count that is increased by a factor of at least about 10 in relation to 1080p displays; f) glasses-free immersive 3-D viewing capability without constraints of the viewers position; and g) the ability to accommodate flexible screens. Systems and methods of the present disclosure can be use with various electronic devices, such as gaming and/or multimedia devices. Examples of electronic devices include, without limitation, portable electronic devices (e.g., Smart phones), video game systems (e.g., Sony® PlayStation 3, Sony® PlayStation 4, Microsoft® Xbox 360, Microsoft® Xbox One, or Nintendo® Wii), and virtual and/or augmented reality systems. Such electronic devices can be configured for wired or wireless communication with systems of the present disclosure.

In some embodiments, a display systems utilizes a projector to display an image and/or video onto a retro-reflective screen, wherein the system is set up to have small observation angles resulting in a significant increase in the light intensity reaching the viewers eye(s) and/or photo detector.

Computer Systems

Another aspect of the present disclosure provides a system that is programmed or otherwise configured to implement the methods of the disclosure. The system can include a computer server that is operatively coupled to a projector and a photo detector. The projector and photo detector can be standalone units, or integrated as a projection and detection system.

Figure 18:
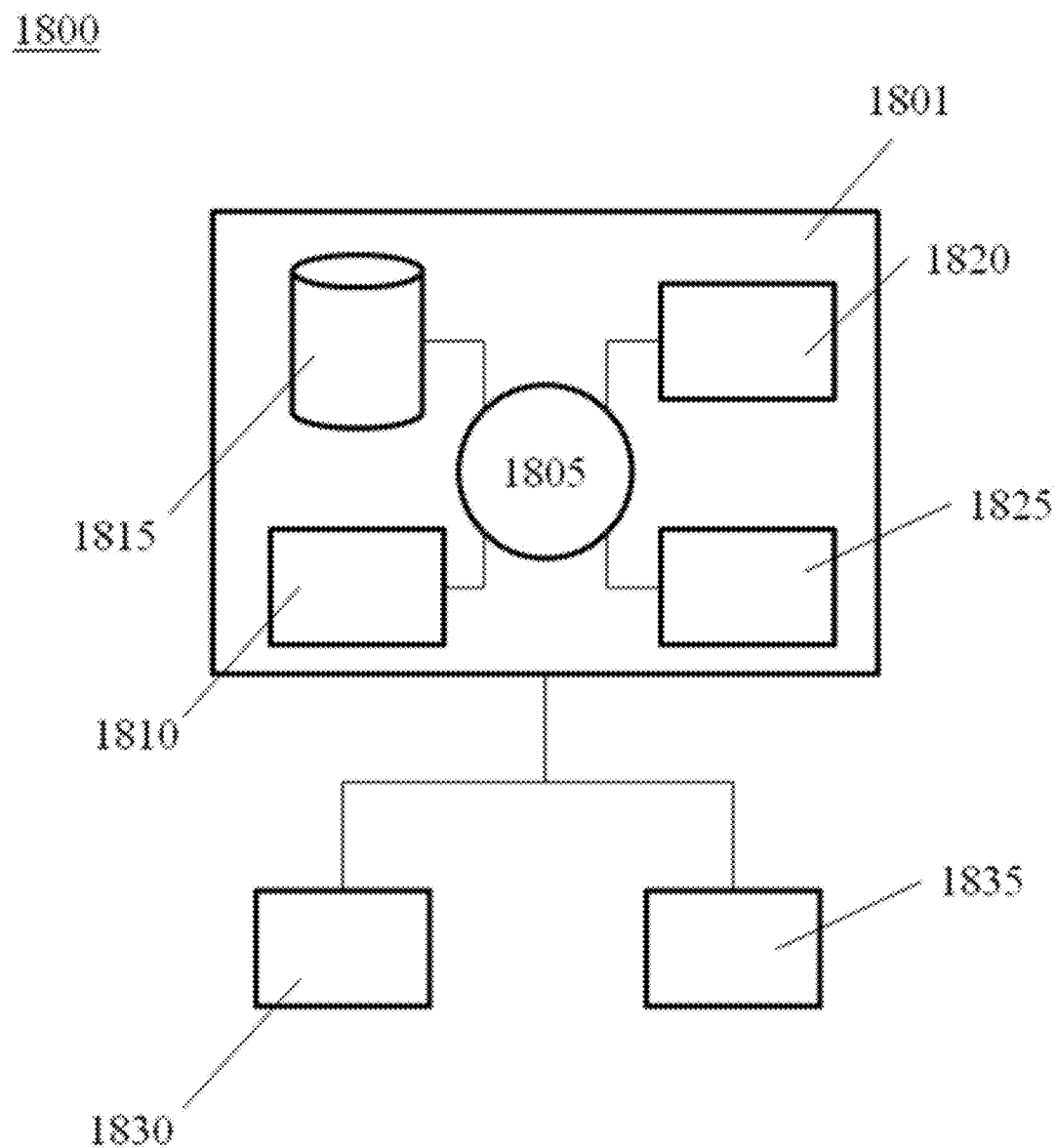
FIG. 18 schematically illustrates a computer system programmed or otherwise configured to facilitate methods of the present disclosure.

FIG. 18 shows a system 1800 comprising a computer server ("server") 1801 that is programmed to implement methods disclosed herein. The server 1801 includes a central processing unit (CPU, also "processor" and "computer processor" herein) 1805, which can be a single core or multi core processor, or a plurality of processors for parallel processing. The server 1801 also includes memory 1810 (e.g., random-access memory, read-only memory, flash memory), electronic storage unit 1815 (e.g., hard disk), communication interface 1820 (e.g., network adapter) for communicating with one or more other systems, and peripheral devices 1825, such as cache, other memory, data storage and/or electronic display adapters. The memory 1810, storage unit 1815, interface 1820 and peripheral devices 1825 are in communication with the CPU 1805 through a communication bus (solid lines), such as a motherboard. The storage unit 1815 can be a data storage unit (or data repository) for storing data. The server 1801 can be operatively coupled to a computer network ("network") with the aid of the communication interface 1820. The network can be the Internet, an internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the server 1801, can implement a peer-to-peer network, which may enable devices coupled to the server 1801 to behave as a client or a server.

The storage unit 1815 can store files or data. The server 1801 can include one or more additional data storage units that are external to the server 1801, such as located on a remote server that is in communication with the server 1801 through an intranet or the Internet.

In some situations, the system 1800 includes a single server 1801. In other situations, the system 1800 includes multiple servers in communication with one another through an intranet and/or the Internet.

The server 1801 can be adapted to store user information and data of or related to a projection environment, such as, for example, display angles and intensity settings. The server 1801 can be programmed to display an image or video through a projector coupled to the server 1801.

Methods as described herein can be implemented by way of machine (or computer processor) executable code (or software) stored on an electronic storage location of the server 1801, such as, for example, on the memory 1810 or electronic storage unit 1815. During use, the code can be executed by the processor 1805. In some cases, the code can be retrieved from the storage unit 1815 and stored on the memory 1810 for ready access by the processor 1805. In some situations, the electronic storage unit 1815 can be precluded, and machine-executable instructions are stored on memory 1810.

The code can be pre-compiled and configured for use with a machine have a processer adapted to execute the code, or can be compiled during runtime. The code can be supplied in a programming language that can be selected to enable the code to execute in a pre-compiled or as-compiled fashion.

The server 1801 is coupled to (e.g., in communication with) a projector 1830 and a photo detector 1835. In an example, the projector 1830 can project an image or video onto a retro-reflective screen. In another example, the project 1830 can project ultraviolet or infrared light onto the retro-reflective screen. The photo detector 1835 can detect (or measure) reflected light from the retro-reflective screen.

The projector 1830 can include one or more optics for directing and/or focusing an image or video onto the retro-reflective screen. The photo detector can be a device that is configured to generate an electrical current upon exposure to light, such as, for example, a charge-coupled device (CCD).

Aspects of the systems and methods provided herein, such as the server 1801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Methods of the disclosure can be facilitated with the aid of applications (apps) that can be installed on electronic devices of a user, such as a portable electronic device (e.g., Smart phone, laptop computer). Examples of portable electronic devices include, without limitation, Smart phones (e.g., Apple® iPhone®, Apple® iPad®, Samsung® Galaxy Tab®). An app can include a GUI on a display of the electronic device of the user. The app can be programmed or otherwise configured to perform various functions of the system.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A method for projecting image or video to a plurality of viewers, comprising:
   a. directing a first light beam from a first projector adjacent to a first viewer onto a retroreflective screen in optical communication with said first projector, wherein said first light beam characterizes a first image or video;
   b. directing a second light beam from a second projector adjacent to a second viewer onto said retroreflective screen in optical communication with said second projector, wherein said second light beam characterizes a second image or video;
   c. presenting at least a portion of said first light beam reflected from said retroreflective screen to said first viewer at a first observation angle less than about 3° at a distance of at least about 2 feet from said retroreflective screen, wherein an observation angle is an angle between a line from a projector to a given location on a screen and a line from that same location on said screen to an eye of a viewer of said screen; and
   d. presenting at least a portion of said second light beam reflected from said retroreflective screen to said second viewer at a second observation angle less than about 3° at a distance of at least about 2 feet from said retroreflective screen.

2. The method of claim 1, wherein at least a portion of said first light beam reflected from said retroreflective screen to said first viewer is not viewable by said second viewer.

3. The method of claim 1, wherein at least a portion of said second light beam reflected from said retroreflective screen to said second viewer is not viewable by said first viewer.

4. The method of claim 1, wherein said first light beam is directed to said retroreflective screen without passage of said first light beam through a beam splitter.

5. The method of claim 1, wherein said second light beam is directed to said retroreflective screen without passage of said second light beam through a beam splitter.

6. The method of claim 1, wherein at least a portion of said first light beam is reflected to said first viewer without passage of said first light beam through a beam splitter.

7. The method of claim 1, wherein at least a portion of said second light beam is reflected to said second viewer without passage of said second light beam through a beam splitter.

8. The method of claim 1, wherein said first image or video is different than said second image or video.

9. The method of claim 1, wherein said first light beam and said second light beam are directed to said retroreflective screen at substantially the same time.

10. The method of claim 1, wherein said first viewer and said second viewer are at different locations with respect to said retroreflective screen.

11. The method of claim 1, wherein at least a portion of said first light beam reflected from said retroreflective screen is presented to said first viewer at an observation angle less than about 3° at a distance of at least about 2 feet from said retroreflective screen.

12. The method of claim 1, wherein said first observation angle is less than about 2°.

13. The method of claim 1, wherein said second observation angle is less than about 2°.

14. The method of claim 1, wherein said first projector or second projector is mounted on a body of said first viewer or second viewer, respectively.

15. The method of claim 1, further comprising providing said first viewer and/or said second viewer with sound to complement said first image or video and/or said second image or video.

16. The method of claim 1, wherein said first image or video and/or said second image or video is three-dimensional.

* * * * *